(12) United States Patent
Catoen

(10) Patent No.: US 8,425,216 B2
(45) Date of Patent: Apr. 23, 2013

(54) CYCLE COUNTING SYSTEM FOR INJECTION MOLDING ASSEMBLY

(75) Inventor: Bruce Catoen, Georgetown (CA)

(73) Assignee: Mold-Masters (2007) Limited (CA)

( * ) Notice: Subject to any disclaimer, the term of this patent is extended or adjusted under 35 U.S.C. 154(b) by 49 days.

(21) Appl. No.: 13/046,404

(22) Filed: Mar. 11, 2011

(65) Prior Publication Data
US 2012/0231103 A1 Sep. 13, 2012

(51) Int. Cl.
B29C 45/38 (2006.01)

(52) U.S. Cl.
USPC .......................... 425/135; 425/169; 425/556

(58) Field of Classification Search .................. 425/169, 425/135, 556
See application file for complete search history.

(56) References Cited

U.S. PATENT DOCUMENTS

| | | | |
|---|---|---|---|
| 4,911,629 A | 3/1990 | Fujita | |
| 5,062,784 A | 11/1991 | Inaba et al. | |
| 5,195,029 A | 3/1993 | Murai et al. | |
| 5,301,120 A | 4/1994 | Magario | |
| 5,316,707 A | 5/1994 | Stanciu et al. | |
| 5,350,547 A | 9/1994 | Yamaguchi et al. | |
| 5,571,539 A | 11/1996 | Starkey | |
| 5,928,578 A * | 7/1999 | Kachnic et al. | 425/556 |
| 5,951,936 A | 9/1999 | Coxhead | |
| 5,972,256 A | 10/1999 | Wurst et al. | |
| 6,073,059 A | 6/2000 | Hayashi et al. | |
| 6,145,022 A | 11/2000 | Takizawa et al. | |
| 6,421,577 B1 | 7/2002 | Triplett | |
| 6,675,055 B1 | 1/2004 | Fischer | |
| 6,685,458 B2 | 2/2004 | Poynor | |
| 6,761,552 B2 | 7/2004 | Fujita | |
| 6,904,333 B2 | 6/2005 | Morimura | |
| 7,072,735 B2 | 7/2006 | Smith | |
| 7,128,548 B2 | 10/2006 | Manner | |
| 7,181,311 B2 | 2/2007 | Dachs et al. | |
| 7,236,841 B2 | 6/2007 | Fischer et al. | |
| 7,261,539 B2 | 8/2007 | Pitscheneder et al. | |
| 7,311,136 B2 | 12/2007 | Manner | |
| 7,342,206 B2 | 3/2008 | Ptasienski et al. | |
| 7,412,301 B1 | 8/2008 | Manda | |
| 7,580,771 B2 | 8/2009 | Quail et al. | |
| 7,585,166 B2 | 9/2009 | Buja | |
| 7,632,438 B2 | 12/2009 | Baumann | |

(Continued)

FOREIGN PATENT DOCUMENTS

| | | |
|---|---|---|
| JP | 60058826 | 4/1985 |
| JP | 63135224 | 6/1988 |

(Continued)

OTHER PUBLICATIONS

Jun. 12, 2012 International Search Report and Written Opinion in International Application No. PCT/CA2012/050145.

Primary Examiner — Tim Heitbrink
(74) Attorney, Agent, or Firm — Heslin Rothenberg Farley & Mesiti P.C.

(57) ABSTRACT

There is set forth herein a system having an injection molding assembly mold including a stationary section and moveable section, the stationary section having a channel assembly, one or more nozzle and a mold cavity, the mold further having a sensor unit array, the sensor unit array comprising one or more sensor unit. The system can include one or more processing circuit that utilizes an output of the one or more sensor unit for determining a condition prevailing within the injection molding assembly.

13 Claims, 17 Drawing Sheets

U.S. PATENT DOCUMENTS

| | | |
|---|---|---|
| 8,280,544 B2 | 10/2012 | Catoen et al. |
| 2002/0031567 A1 | 3/2002 | Magario |
| 2002/0032552 A1 | 3/2002 | Nishiyama et al. |
| 2004/0093114 A1 | 5/2004 | Magario et al. |
| 2005/0143850 A1 | 6/2005 | Pavlik et al. |
| 2006/0082009 A1 | 4/2006 | Quail et al. |
| 2006/0129268 A1 | 6/2006 | Conner et al. |
| 2007/0061033 A1 | 3/2007 | Lucas et al. |
| 2008/0088047 A1 | 4/2008 | Trudeau |
| 2008/0097626 A1 | 4/2008 | Reed et al. |
| 2008/0097642 A1 | 4/2008 | Zwicker |
| 2008/0098401 A1 | 4/2008 | Weatherhead et al. |
| 2008/0290541 A1 | 11/2008 | Baumann |
| 2009/0053546 A1 | 2/2009 | Di Domenico |
| 2009/0192835 A1 | 7/2009 | Baumann et al. |
| 2011/0106284 A1 | 5/2011 | Catoen et al. |
| 2011/0106285 A1 | 5/2011 | Catoen et al. |
| 2011/0106288 A1 | 5/2011 | Catoen et al. |

FOREIGN PATENT DOCUMENTS

| | | |
|---|---|---|
| JP | 1320126 A | 12/1989 |
| JP | 4212826 | 8/1992 |
| JP | H7161745 | 6/1995 |
| JP | 2010/105369 | 5/2010 |
| WO | WO-99/01806 | 1/1999 |
| WO | WO-0240247 A1 | 5/2002 |
| WO | WO-2004/051857 | 6/2004 |
| WO | WO-2010031159 A1 | 3/2010 |
| WO | WO-2010/049068 | 5/2010 |
| WO | WO-2010/074897 | 7/2010 |

* cited by examiner

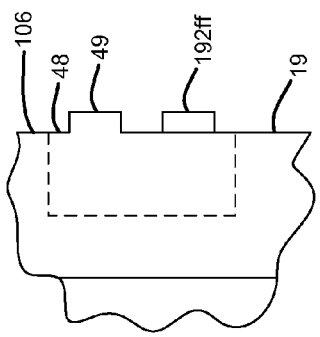
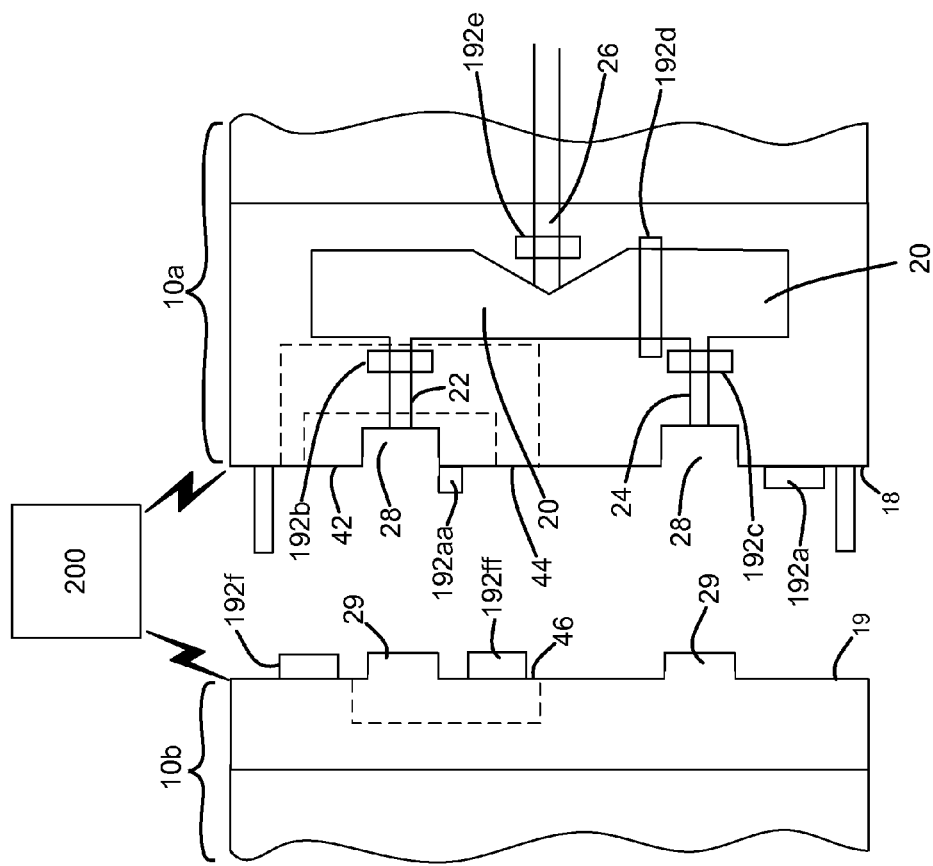

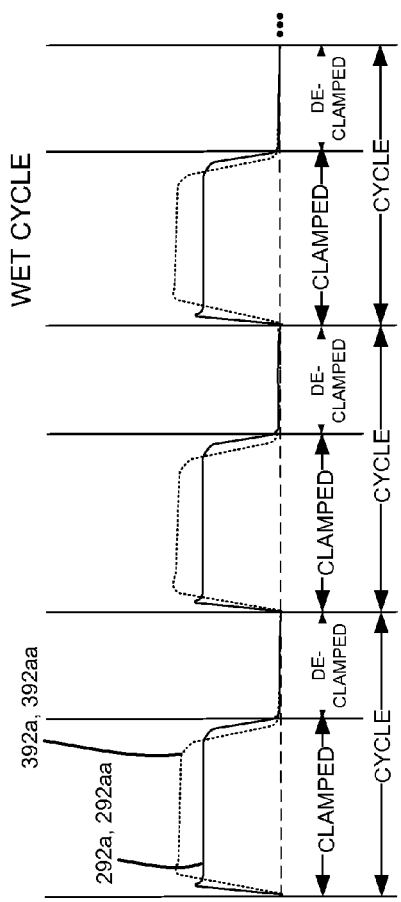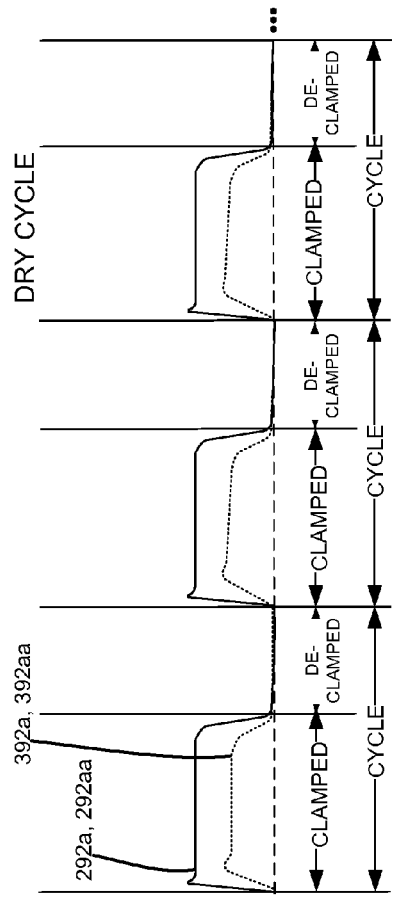

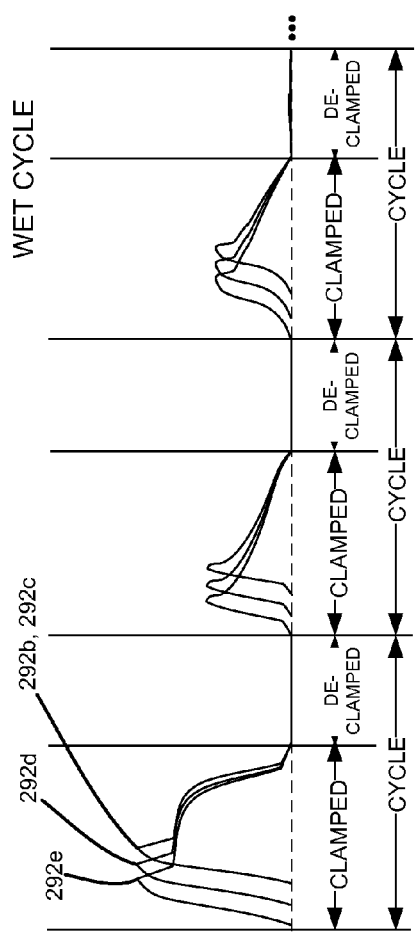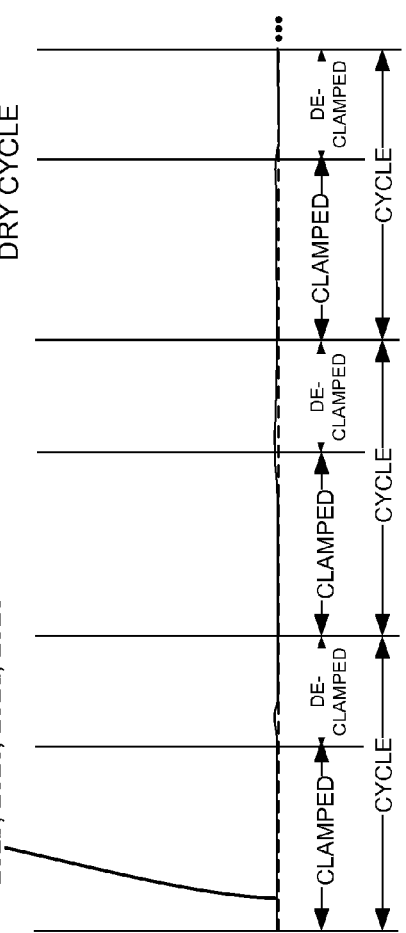

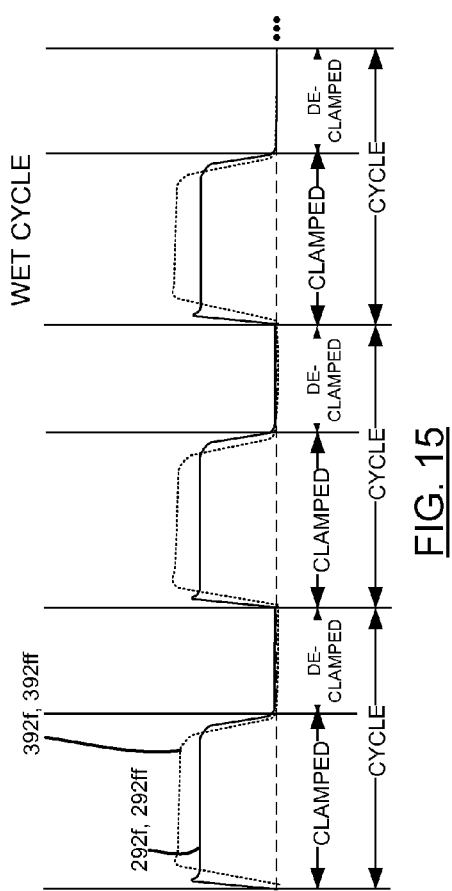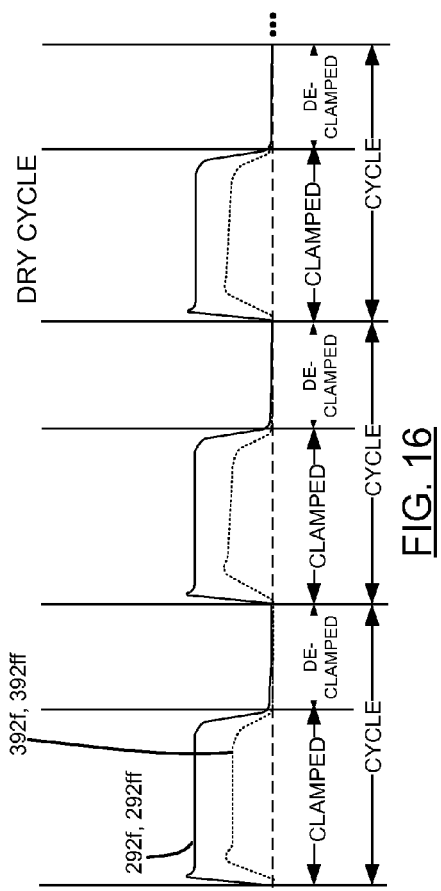

CYCLE COUNTING SYSTEM FOR INJECTION MOLDING ASSEMBLY

FIELD OF THE INVENTION

The present invention relates to injection molding assemblies in general and specifically to an injection molding assembly mold.

BACKGROUND OF THE PRIOR ART

Injection molding assemblies are known to include a variety of components including an injection molding machine and a mold. An injection molding machine can be capable of receiving injection molding material, heating the material, and forcing the injection molding material into the mold.

A mold can comprise a number of components. In one embodiment a mold can comprise a stationary section and a moveable section, a hot runner comprising a channel assembly having one or more channels, heating elements for heating the one or more channel and a system of nozzles, and a cavity releasably closable in relation to the stationary section. Where a mold comprises a hot runner, the stationary section is sometimes referred to as a hot half and a moveable section is sometimes referred to as a cold half. Some hot runners are equipped with a temperature regulator for regulating a temperature of injection molding material (a melt stream) through a hot runner. A temperature regulator can include temperature sensors operatively disposed to sense a temperature of a hot runner. Other injection molding systems without hot runners have unheated channels through which injection molding material flows.

In the performance of a production run, an injection molding assembly including a certain mold is typically operated to perform typically a number of cycles. For each cycle, the cold half of the mold can be clamped to the hot half of the mold, subject to injection of injection molding material into the cavity, allowed to harden, and then de-clamped to release an injection molding product. U.S. Patent Publication No. 2004/0247724 describes a contact sensing sensor unit for use in counting a number of openings and closings of moveable and stationery mold sections. The contact sensing sensor unit of U.S. Patent Publication No. 2004/0247724 is disposed at an external surface of a stationary mold section.

SUMMARY OF THE INVENTION

There is set forth herein a system having an injection molding assembly mold including a stationary section and moveable section, the stationary section having a channel assembly, one or more nozzle and a mold cavity, the mold further having a sensor unit array, the sensor unit array comprising one or more sensor unit. The system can include one or more processing circuit that utilizes an output of the one or more sensor unit for determining a condition prevailing within the injection molding assembly.

BRIEF DESCRIPTION OF THE DRAWINGS

Features described herein can be better understood with reference to the drawings described below. The drawings are not necessarily to scale, emphasis instead generally being placed upon illustrating the principles of the invention. In the drawings, like numerals are used to indicate like parts throughout the various views.

FIG. 3 is a schematic diagram of an injection molding assembly having a sensor unit assembly and a plurality of mold section inserts;

FIG. 4 is a schematic diagram of a mold section insert having disposed thereon a sensor unit;

FIGS. 11-20 are signal plots for sensor units which can be incorporated in a sensor unit array;

DETAILED DESCRIPTION OF THE INVENTION

Figure 1:
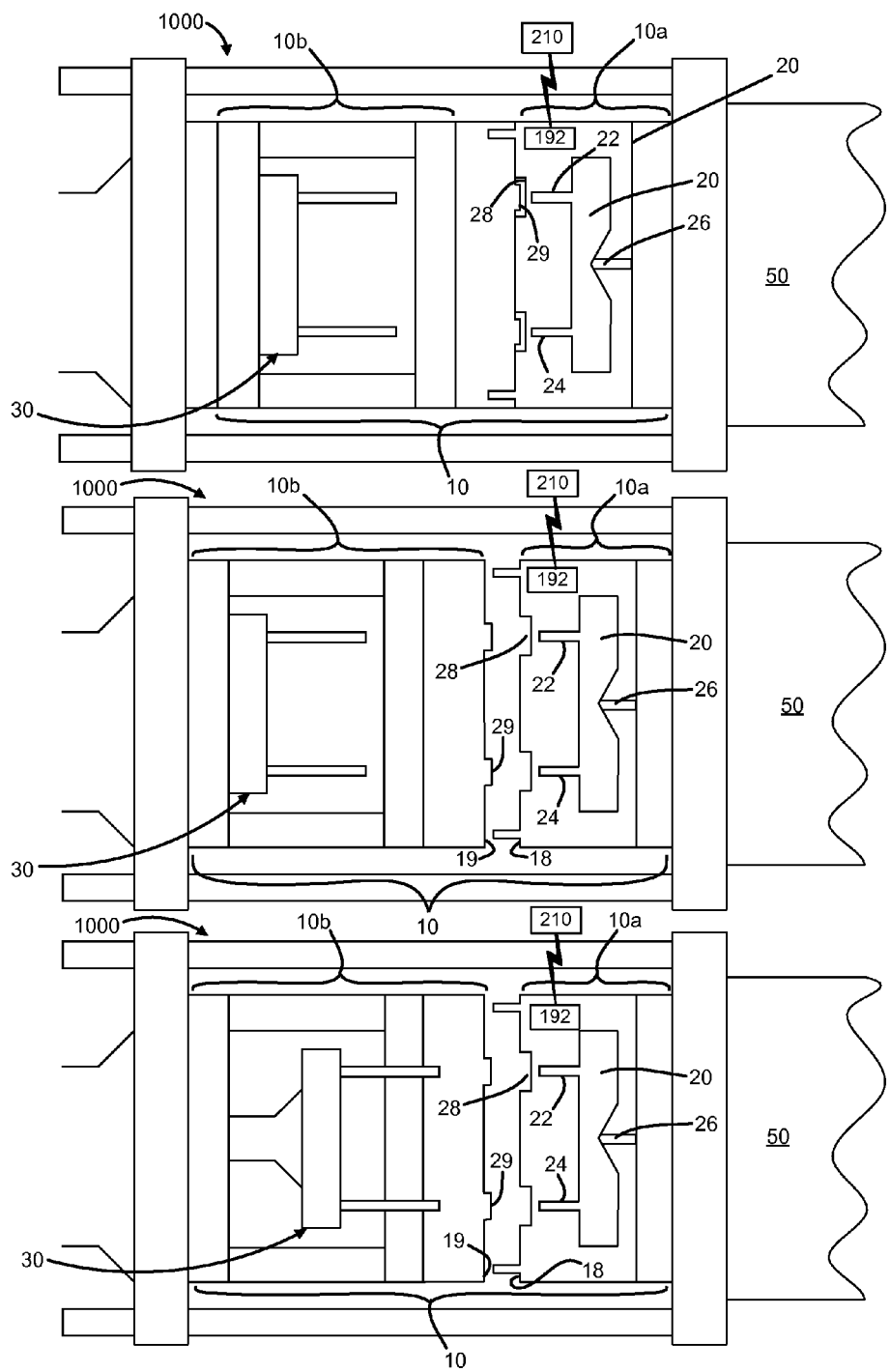
FIG. 1 is a schematic diagram illustrating an injection molding assembly cycle.

There is set forth herein a system 1000 having an injection molding assembly mold 10 including a stationary section 10a and moveable section 10b. Stationary section 10a can include a sprue 26, channel assembly 20 (manifold) one or more nozzle 22, 24. In one embodiment, mold 10 can include a mold cavity 28 and a mold core 29. Mold cavity 28 can be defined by stationary section 10a. Mold core 29 can be defined by moveable section 10b. Regarding facing surfaces 18 and 19 of mold sections 10a and 10b, facing surfaces 18 and 19 can be defined by mold plates. The mold 10 can further have a sensor unit array 192, the sensor unit array comprising one or more sensor unit. As will be described further herein, system 1000 can utilize an output of the one or more sensor unit for determining a condition prevailing with an injection molding assembly, e.g., a cycle count of one or more component of the mold 10. System 1000 can include an injection molding machine 50 for use in forcing injection molding material into mold 10. System 1000 as set forth herein and can include a sensor unit array 192 and one or more processing circuit, the one or more processing circuit including, in one embodiment, a mold processing circuit 200.

Operation of an injection molding assembly cycle can be understood with reference to FIG. 1. With mold 10 in a clamped state (first view) injection molding material can be forced by injection molding machine 50 through sprue 26 channel assembly 20 and one or more nozzle 22, 24 into cavity 28 of stationary section 10a, sometimes referred to as an injection half or "hot half." After injection of molding material is complete for a certain cycle, moveable mold section 10b can be de-clamped and separated from stationary mold section 10a (second view). With mold section 10b separated from mold section 10a, ejector assembly 30 can be activated (third view) to eject molded parts from mold section 10b which prior to ejection can be held in place by a mold core 29. In one embodiment, mold stationary section 10b can be devoid of ejector assembly 30. After ejection of a finished part, moveable mold section 10b can be re-clamped to the clamped state as shown in FIG. 1 (first view).

Figure 2:
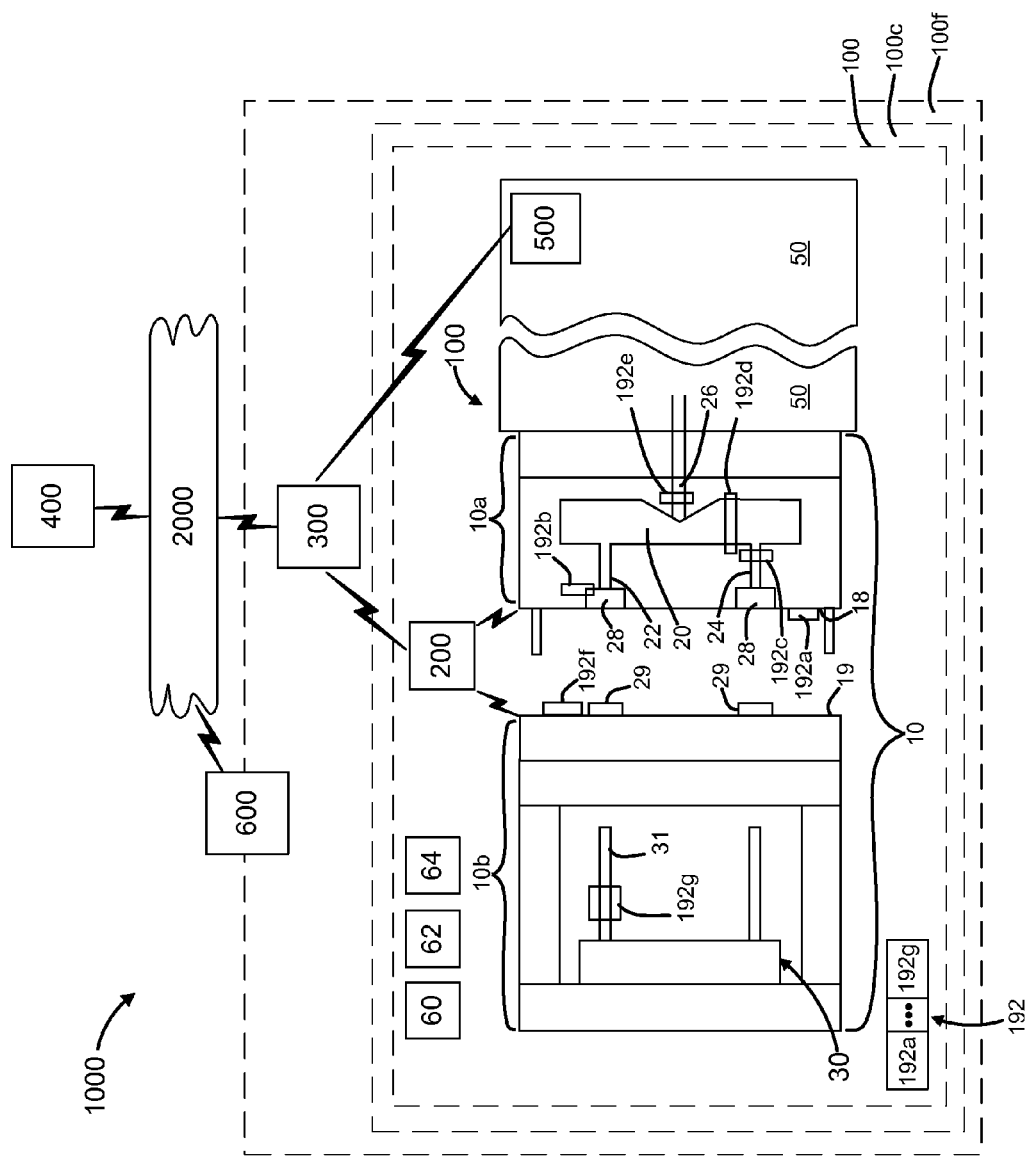
FIG. 2 is a schematic diagram of an injection molding assembly having a sensor unit array.

System 1000 can include a sensor unit array 192 having one or more sensor unit for use in determining a cycle count of one or more component of the mold 10. Referring to FIG. 2, injection molding assembly 100 can have a mold 10, an injection molding machine 50 and a plurality of auxiliary mold assembly components, e.g., a dryer 60, a chiller 62, and a robot 64. Injection molding machine 50 can have an associated injection molding machine processing circuit 500. Sensor unit array 192 of system 1000, in one embodiment can include sensor 192a for sensing a clamping state (clamped or declamped) of mold 10. In the particular embodiment of FIG. 2, sensor unit array 192 of mold 10 can also include sensor unit 192b, sensor unit 192c, sensor unit 192c, sensor unit 192d, sensor unit 192e, sensor unit 192f, and sensor unit 192g. Alternative embodiments having additional sensor units 192aa and 192ff are described with reference to FIG. 3 and FIG. 4. A sensor unit of sensor unit array 192 can be of one or more sensor unit type, e.g., a force sensor unit, a pressure sensor unit, a contact sensor unit, a temperature sensor unit, an accelerometer. In one embodiment, a force sensing sensor unit can be provided by a strain gauge. Various aspects of strain gauges are set forth in reference to FIGS. 5-10 herein.

Now referring to sensor unit 192a, sensor unit 192a in one embodiment can be a clamping state sensor unit provided by e.g., a contact switch or proximity switch disposed at an external surface 18 e.g., defined by a mold plate of stationary section 10a. Sensor unit 192a can be disposed to sense contact with moveable section 10b and accordingly can output a signal 292a as depicted in FIG. 11 during a wet cycle. As shown in FIG. 11, signal 292a can indicate a clamping state of mold 10. Signal 292a can include a clamped state when mold 10 is in a clamped state. Signal 292a as shown in FIG. 12 indicates a declamped state when mold 10 is in a declamped state as shown in the second and third views of FIG. 1. FIG. 12 shows an output signal 292a during a dry cycle. As can be seen by comparing FIGS. 11 and 12, an output of sensor unit 192a during a dry cycle can coincide with an output of sensor unit 192a during a wet cycle.

Regarding further aspects of sensor unit array 192, sensor unit array 192 can include one or more sensor unit for sensing whether there is a flow of fluid (in the form of a melt stream) through mold section 10a. Sensor units for determining whether there is a flow a flow of fluid through mold section 10a can be disposed internally of mold section 10b, e.g., at a one or more nozzle 22, 24, a mold channel assembly 20 (manifold) or at a mold sprue 26. In the particular embodiment of FIG. 2, sensor unit array 192 includes a plurality of sensor units for sensing whether there is a flow of fluid through mold stationary section 10a. Sensor unit array 192 in the particular embodiment of FIG. 2 includes sensor unit 192b operatively disposed for sensing whether there is a flow of fluid through cavity 28, sensor unit 192c is operatively disposed for sensing whether there is a flow of fluid through nozzle 24, sensor unit 192d is operatively disposed for sensing whether there is a flow of fluid though channel assembly 20 and sensor unit 192e is operatively disposed for sensing whether there is a flow of fluid through sprue 26. Sensor unit array 192 can have a greater number or smaller number of sensor units for sensing whether there is a flow of fluid through stationary mold section 10a, i.e., 0 to N sensor units, N>4.

A sensor unit of sensor unit array 192 for sensing whether there is a flow of fluid through mold section 10a, e.g., sensor unit 192b, sensor unit 192c, sensor unit 192d, sensor unit 192e can be provided by a plurality of different types of sensor units. In one embodiment, one or more sensor unit of sensor unit array 192 for sensing whether there is a flow of fluid through mold stationary section 10a can be provided by a force sensor unit. In one embodiment, one or more sensor unit of sensor unit array 192 for sensing whether there is a flow of fluid through mold half 10a can be provided by a pressure sensor unit. In one embodiment, one or more sensor unit of sensor unit array 192 for sensing whether there is a flow of fluid through mold half 10a can be provided by a temperature sensor unit. In one embodiment, one or more sensor unit of sensor unit array 192 can be provided by an accelerometer. In one embodiment one or more sensor units of sensor unit array 192 for sensing whether there is a flow of fluid through mold half 10a can be provided by a flow meter sensor unit (such as an ultrasonic flow meter disposed across a melt stream and deployed as nozzle sensor unit 192c, channel assembly sensor unit 192d, or inlet sensor unit 192e).

Examples of commercially available sensor units which can be employed in sensor unit array 192 for sensing whether there is a flow of fluid through mold half 10a, e.g., as one or more of sensor unit 192b, sensor unit 192c, sensor unit 192d, sensor unit 192e are summarized in Table A.

TABLE A

| Example | Type | Commercially Available Example Of One Or More Sensor Unit 192b, 192c, 192d, 192e |
|---------|------|---|
| 1 | Force | SGT-1/350-SY11 (Strain gauge Sensor Unit) |
| 2 | Force | LC321-250 Miniature Compression Load Cell |
| 3 | Force | CN4-50-EK (Available from Dynasen, Inc. of Goleta, CA) |
| 4 | Pressure | PX329 (Alternatively, PX319, PX01, PX102) |
| 5 | Pressure | PX35D0 |
| 6 | Pressure | PX40 |
| 7 | Pressure | 6152A (Available from Kistler Instrument Corp., Amherst, NY) |
| 8 | Pressure | 6184AAE (Available from Kistler Instrument Corp., Amherst, NY) |
| 9 | Temperature | AD590 |
| 10 | Temperature | STC-100 |
| 11 | Temperature | OL-708 |
| 12 | Accelerometer | ACC301 |
| 13 | Accelerometer | ACC102 |
| 14 | Flow Meter | FTB-1400 |

Except where otherwise noted, the exemplary sensor units of Table A are available from Omega Engineering, Inc. of Stanford, Conn., USA.

Figure 5:
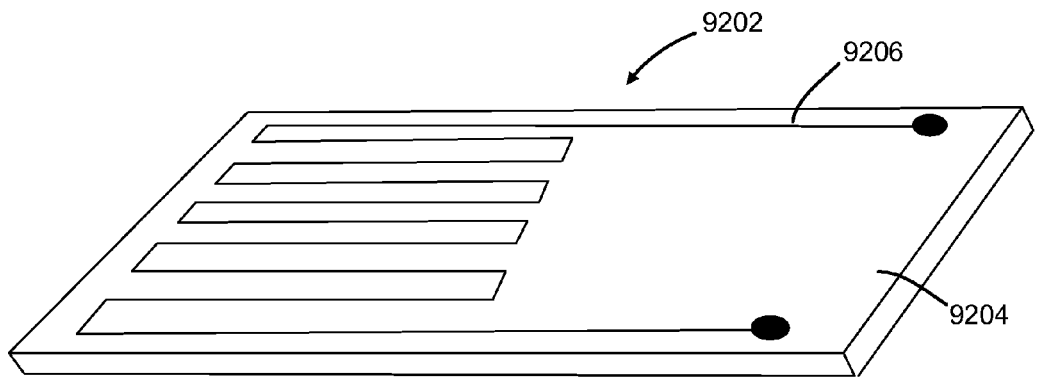
FIG. 5 is a perspective view of a force sensor unit provided by a strain gauge.

Referring to Examples 1-3 of Table A, sensor unit 192b, 192e for sensing a flow of injection molding material through mold section can be provided by a force sensor unit provided by a strain gauge configured to sense strain force on an object to which the strain gauge is attached. An exemplary strain gauge 9202 is shown in FIG. 5. Strain gauge 9202 can include deformable backing 9204 and patterned conductor 9206. When deformable backing 9204 is stretched, resistance of conductor 9206 increases. When deformable backing 9204 is compressed, a resistance of conductor 9206 decreases. Accordingly, strain gauge 9202 can be employed to sense a force. Strain gauge 9202 can be disposed at a surface of a structural member of a mold so that the strain gauge generates a signal responsively to deformation of the structural member. Exemplary deployments of force sensor units comprising strain gauges for sensing of a flow of fluid through mold section 10a are shown and described with reference to FIGS. 6-8. Shown in FIGS. 5-8 as being a foil type of strain gauge, strain gauge 9202 can be another type of strain gauge, such as a semiconductor based piezoresistive strain gauge.

Figure 6:
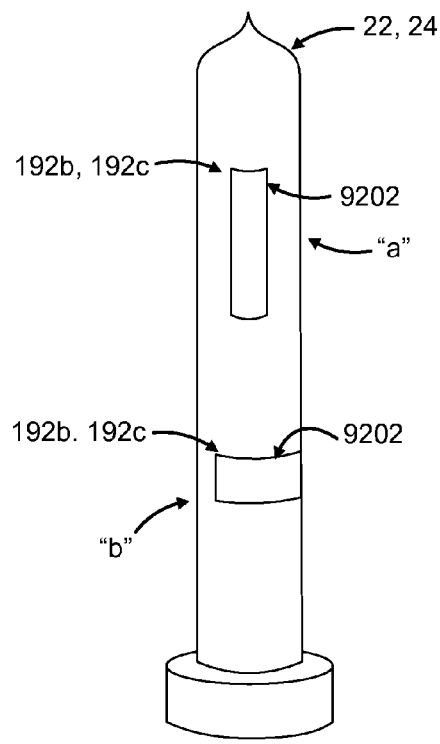
FIG. 6 is a perspective view of a nozzle having disposed on an external surface thereof first and second strain gauges.

A sensor unit provided by a strain gauge 9202 is shown in FIG. 6. In FIG. 6, there is shown an injection molding assembly nozzle 22, 24. Strain gauge 9202 can be disposed along (location "a") or around (location "b") an external surface of nozzle 22, 24. During a wet cycle, pressures inside of mold cavity 28 can be substantial (e.g., up to 40,000 psi or greater). Accordingly, resulting deformation of nozzle 22, 24 can be expected.

Figure 7:
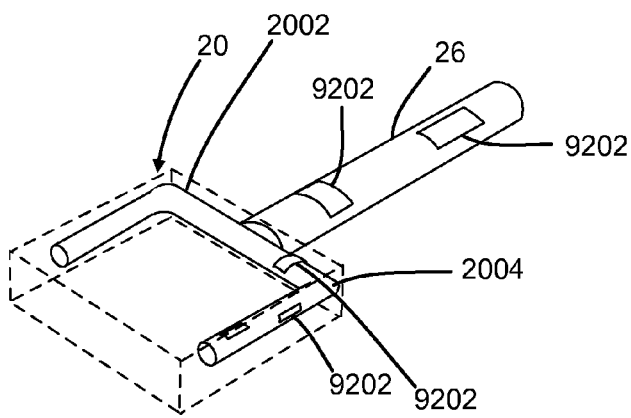
FIG. 7 is a perspective view of a mold inlet and channel assembly having disposed thereon a plurality of strain gauges.

Referring to FIG. 7, FIG. 7 shows various force sensor units provided by a strain gauge disposed at a channel assembly 20 and a sprue (inlet) 26. Strain gauge 9202 can be disposed along or around an external surface one or more channel of channel assembly 20. Strain gauge 9202 can also be disposed along or around an external surface inlet 26 to channel assembly 20. During a wet cycle, the one or more channel of channel assembly 20 and inlet 26 can be expected to deform which deformation can be sensed with one or more strain gauge 9202. There is set forth herein one or more sensor units including a force sensor unit provided by a strain gauge disposed at a location selected from the group consisting of along or around an external surface of a nozzle, along or around an external surface of a channel, along or around an external surface of an inlet.

Figure 8:
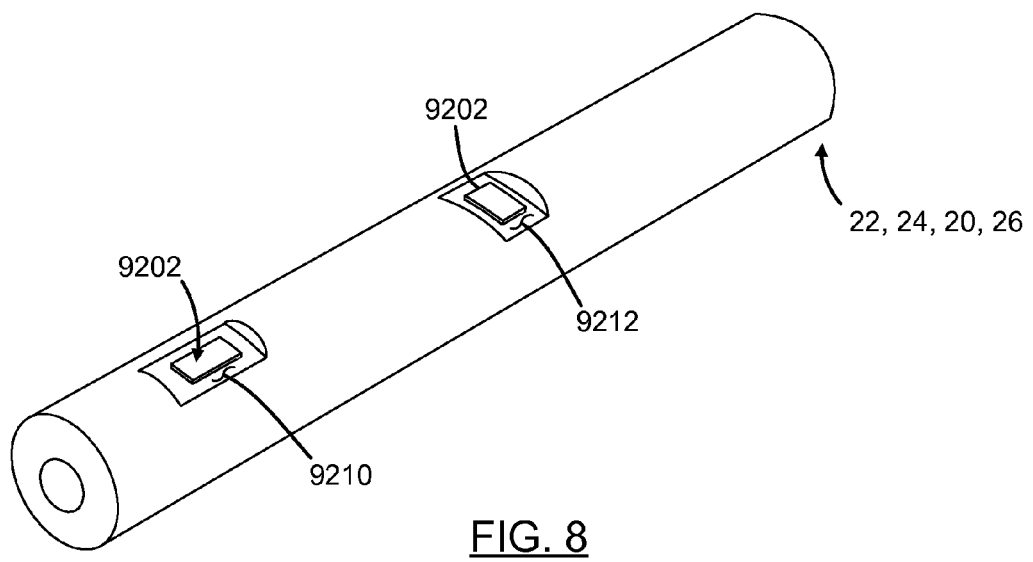
FIG. 8 is a perspective view of a cylindrical structural member of a mold component having flat spots for receipt of a strain gauge.
Figure 9:
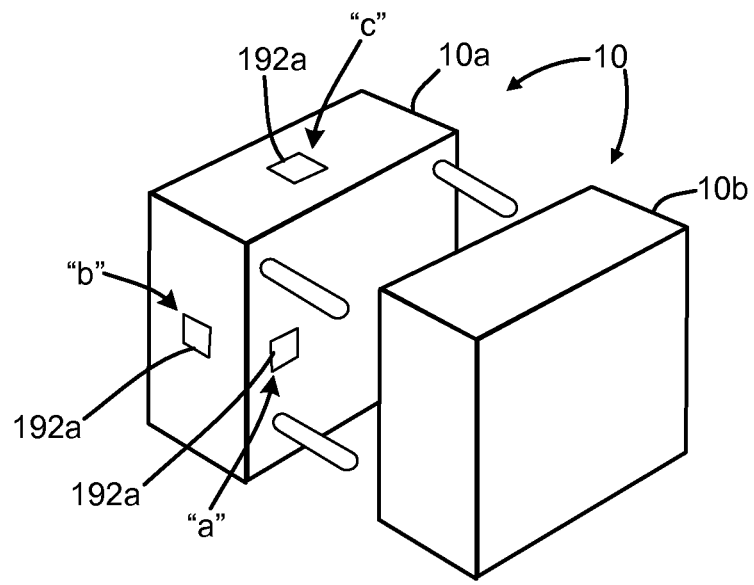
FIG. 9 is a first perspective view of a mold having various sensor units for sensing a clamping state of the mold.

It is seen that nozzles 22, 24, channels 2002, 2004, and inlet 26 of stationary section 10a can be provided by cylindrical structural members. In one embodiment, an external surface of a cylindrical structural member 22, 24, 2002, 2004, 26 of mold section 10a can be provided with one or more flat spots 9210, 9212 for receiving a strain gauge 9202. Disposing a strain gauge 9202 at a flat spot encourages accurate performance of a strain gauge 9202. A calibrated resistance of a strain gauge can be determined based on its zero strain state, i.e., its state when disposed at a flat surface. The one or more flat spots of a structural member as depicted in FIG. 8 can be replaced by areas of reduced wall thickness of the structural member at which strain gauge 9202 is disposed. A structural member 22, 24, 20, 26 on which strain gauge 9202 is disposed can have a standard thickness and one or more areas of reduced thickness. The one or more areas of reduced thickness can be expected to experience more deformation during a wet cycle than an area of standard thickness. Accordingly, providing one or more areas of reduced thickness and disposing one or more strain gauge 9202 at the respective one or more area of reduced thickness increases the sensitivity by which flow of fluid through mold section 10a can be sensed. While flat spots 9210, 9212 can be replaced by areas of reduced thickness, the areas of reduced thickness can be co-located with flat spots 9210, 9212.

Referring to Examples 4-7 of Table A, a sensor unit for sensing a flow of fluid through stationary section 10a can be provided by a pressure sensor unit. A pressure sensor unit can be utilized as cavity sensor unit 192b and can be disposed in cavity 28 for sensing pressure of a cavity 28. A pressure sensor unit can be disposed elsewhere in the melt stream for sensing pressure, e.g., at nozzle 22, 24 as sensor unit 192c, at channel assembly 20 as sensor unit 192d, at inlet 26 as sensor unit 192e.

Referring to Examples 9-11 of Table A, a sensor unit for sensing a flow of fluid through stationary section 10a can be provided by a temperature sensor unit. A temperature sensor unit can be utilized as cavity sensor unit 192b and can be disposed in cavity 28 for sensing temperature of a cavity. A temperature sensor unit can be disposed elsewhere in the melt stream for sensing temperature, e.g., in nozzle 22, 24 as sensor unit 192c, in channel assembly 20 as sensor unit 192d in inlet 26 as sensor unit 192e.

Referring to Examples 12 and 13 of Table A, a sensor unit for sensing a flow of fluid through mold section 10a can be an accelerometer, e.g., deployed as nozzle sensor unit 192c for sensing an opening and closing of a valve of a nozzle, e.g., nozzle 22, 24.

During a wet cycle, an output of a sensor unit of sensor unit array 192 for sensing whether there is a flow of fluid through mold half 10a, in one embodiment, can have output characteristics as shown in FIG. 13. FIG. 13 shows an exemplary expected output signal 292b, 292c, 292d, 292e of a sensor unit, e.g., sensor unit 192b, sensor unit 192c, sensor unit 192d, sensor unit 192e, of sensor unit array 192 during a wet cycle of mold 10. Each cycle can be expected to have a clamped state period and a declamped state period. During a clamped state period of each wet cycle, an amplitude of signal 292b, 292c, 292d, 292e can increase and then decrease before an end of clamped state. A peak amplitude of signal 292b, 292c, 292d, 292e can be higher during an initial cycle of a production run relative to remaining cycles since additional energy can be utilized for forcing fluid through mold half 10a during an initial cycle. Where provided by a common sensor unit type, the expected outputs can be expected to be similar except time shifted as shown in FIG. 13.

During a dry cycle, an output of sensor unit, e.g., sensor units 192b, 192c, 192d, 192e of sensor unit array 192 for sensing a flow of fluid through mold half 10a, in one embodiment, can have output characteristics as shown in FIG. 12. FIG. 12 shows an exemplary expected output signal 292b, 292c, 292d, 292e of a sensor unit, e.g., sensor units 192b, 192c, 192d, 192e of sensor unit array 192 during a dry cycle of mold 10. It is seen that a signal 292b, 292c, 292d, 292e output by sensor units 192b, 192c, 192d, 192e during a dry cycle can be essentially flat line. A dry cycle like a wet cycle can be characterized by clamped state periods and declamped state periods.

Referring to further aspects of sensor unit array 192, sensor unit array 192 can also include a clamping state sensor unit 192f disposed at moveable section 10b of mold 10, e.g., at a surface 19 defined by, e.g., a mold plate of moveable section 10b. Clamping state sensor unit 192f can be provided, e.g., by a contact switch or a proximity switch. An exemplary signal 292f output by clamping state sensor unit 192f during a wet cycle is shown in FIG. 15. It is seen that during clamped state periods of mold 10, a signal 292f output by sensor unit 192f can be driven high. Referring to FIG. 16, FIG. 16 shows an exemplary signal 292f output by sensor unit 192f during a dry cycle. It is seen that signal 292f output by sensor unit 192f can be driven high during a clamping state period of mold 10 whether the clamping state period is during a wet cycle or a dry cycle. Signal 392f shown in dashed view in FIGS. 15 and 16 is an exemplary signal output by a clamping state sensor unit 192f where the clamping state sensor unit is adapted to output a non-binary amplitude varying signal. Signal 292f shown in solid line view in FIGS. 15-16 illustrates an exemplary signal output by a clamping state sensor unit 192f where the sensor unit is adapted to output a variable amplitude signal having an amplitude varying responsively to applied force.

Figure 17:
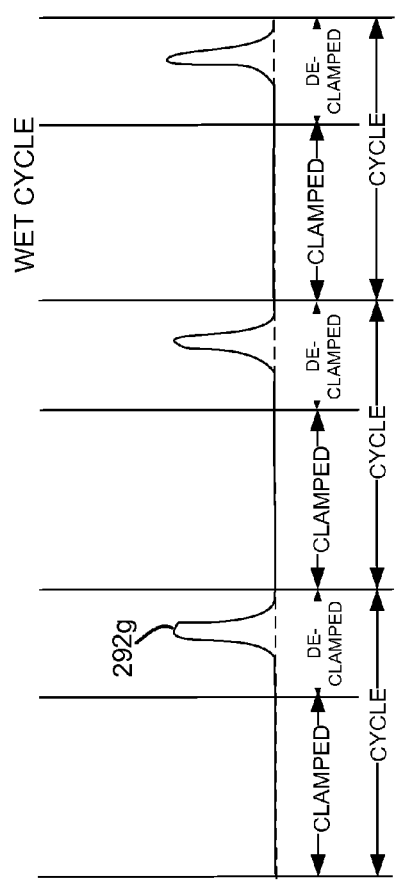
Figure 18:
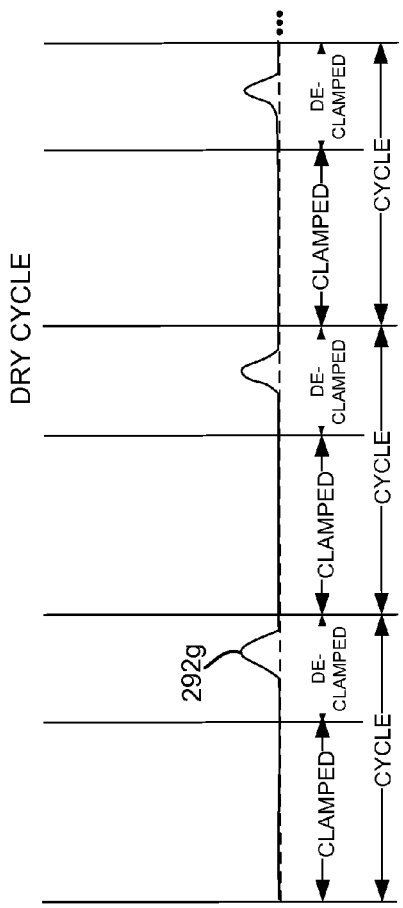
Figure 19:
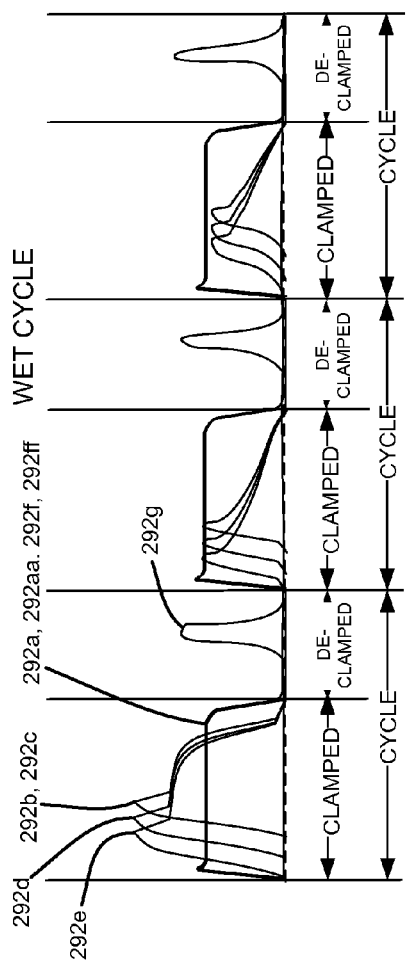

Referring to further aspects of sensor unit array 192, in one embodiment, injection molding assembly mold 10 in one embodiment can include sensor unit 192g for sensing ejection events of mold 10, i.e., whether a finished part has been ejected from mold 10. Sensor unit 192g can be disposed at ejector assembly 30. In one embodiment, sensor unit 192g can be a force sensor unit disposed to sense resistive counter forces imparted to ejector pin 31 of ejector assembly 30 by a finished mold part during an ejection. If ejector pin 31 forces out a finished part, sensor unit 192g can output a signal above a predetermined threshold. In one example, sensor unit 192g can be a load cell force sensor unit that is mounted so that an active surface thereof is mounted in contact with ejector pin 31 and transversely to an axis of ejector pin 31. When ejector assembly 30 is operated to eject a finished part, sensor unit 192g can output a signal 292g having characteristics as shown in FIG. 17. In some instances, ejector pins 31 may be activated during dry cycles for testing purposes without a molded part being formed and held on a moveable section 10b. In such instances, an output signal output by sensor unit 192g will not output a signal having the peak amplitude of an output signal in the case a finished part is ejected. Referred to the signal output diagrams of FIGS. 17 and 18, signal 292g can have periods of highest peak amplitude where a part is ejected (periods 604, 608, 612) and periods of intermediate peak amplitude when an ejector assembly 30 is activated during a dry cycle (periods 616, 620). Signal 292g output by sensor unit 292g can have zero or near zero amplitude during other periods of operation.

In Table B there are indicated commercially available examples of sensor units which can be disposed at ejector assembly 30 for sensing whether a finished part has been ejected from moveable section 10b. Force sensor units can be deployed for sensing actuations of ejector assembly 30 as well as accelerometers.

TABLE B

| Example | Type | Commercially Available Example For Sensor Unit 192 g |
|---|---|---|
| 1 | Force | DLC101 Dynamic Load Cell |
| 2 | Force | LCMHD-10 Low Profile Tension And Compression Load Cell |
| 3 | Force | LC321-250 Miniature Compression Load Cell |
| 4 | Force | LCGB-500 Miniature Compression Load Cell |
| 5 | Force | LCKD-5 Load Cell |
| 6 | Accelerometers | ACC 301 |
| 7 | Accelerometers | ACC 102 |

The sensor units indicated in Table B are available from Omega Engineering, Inc. of Stanford, Conn., USA.

In some embodiments, one or more of stationary section 10a and moveable section 10b of mold 10 can be configured to be modular. A section of mold 10 e.g., stationary section 10a and/or moveable section 10b, can have a fixed (base) portion and a modular portion. A fixed (base) portion can also be regarded as a major body portion. In one example, where stationary section 10a is modular, a channel assembly 20 and the structural member defining surface 18 can be fixed, while a cavity insert 42 including cavity 28 and a nozzle insert 44 including one or more nozzle 22 can be modular. A modular portion and a fixed (base) portion of a mold section of modular construction can be differentiated in that a modular portion in typical operation is subject to more frequent replacement than a fixed portion. Where moveable section 10b is provided to be of modular moveable construction, modular portions of section 10b can include a core insert 46 including core 29. Where mold 10 is used for making a polyethylene terephthalate (PET) container, moveable section 10b, as shown in FIG. 4, can replaceably carry a thread split insert 48 having a thread split 49 for use in defining a container preform.

In one embodiment, where mold 10 is of modular construction, sensor unit array 192 can include one or more sensor unit disposed at one or more replaceable portion of mold 10. Such sensor units disposed at modular replaceable portion of a mold 10 can be in addition to or in place of remaining sensor units disposed at base portions of mold 10. Referring to FIG. 3 there is shown sensor unit 192aa disposed at cavity insert 42 and sensor unit 192b disposed at nozzle insert 44 and sensor unit 192ff disposed at core insert 46. In another embodiment, as shown in FIG. 4, sensor unit 192ff can be disposed at a thread split insert 48 of mold section 10b. In one embodiment, sensor units 192aa and 192ff can be clamping state sensor units disposed and configured to sense contact between stationary section 10a and moveable section 10b of mold 10 and which can output clamping state indicating signals as shown in FIGS. 11 and 12 and FIGS. 15 and 16 respectively.

In Table C there are presented commercially available sensor units which may be employed in sensor unit array 192 for sensing a clamping state of mold 10.

TABLE C

| Example | Type | Commercially Available Example For One Or More Sensor Unit 192a, 192aa, 192f, 192ff |
|---|---|---|
| 1 | Contact | GE300-BT (Available from General Electric) |
| 2 | Contact | D40Z (Available from Omron Corporation, Kyoto, Japan) |
| 3 | Contact | Micro-Switch, BZ Series (Available from Honeywell International) |
| 4 | Contact | Micro-Switch, V-Basic, V7 Series (Available from Honeywell International) |
| 5 | Proximity | E57 |
| 6 | Proximity | IPROX E59-M12A105C02-D1 |
| 7 | Proximity | PRX102 |
| 8 | Force | SGT-1/350-SY11 (Strain gauge sensor unit) |
| 9 | Force | CN4-50-EK (Available from Dynasen, Inc. of Goleta, CA) |
| 10 | Force | BICN2-50-EK (Available from Dynasen, Inc. of Goleta, CA) |
| 11 | Force | LCMHD-10 Low Profile Tension And Compression Load Cell |
| 12 | Force | LCMHD-10 Low Profile Tension And Compression Load Cell |
| 13 | Accelerometer | ACC 301 |

Except where otherwise stated, the examples of commercially available sensor units indicated in Table C are available from Omega Engineering, Inc. of Stanford, Conn., USA.

Referring to Examples 1-7 in Table C, clamping state sensor units 192a, 192aa, 192f, 192ff can be provided by sensor units that output a binary state signal (logic high for clamped, logic low for declamped). Referring to Examples 8-12, clamping state sensor units 192a, 192aa, 192f, 192ff can be provided by sensor units that output an amplitude variable signal 392a, 392aa, 392f, 392ff as depicted in FIGS. 11 and 12, and FIGS. 15 and 16 that varies in amplitude depending on a magnitude of a sensed force. Where a clamping state sensor unit outputs an amplitude variable signal, varying depending on a magnitude of sensed force, a wet cycle and a dry cycle can be discriminated by processing a signal output by one or more clamping state sensor units 192a, 192aa, 192f, 192ff. When mold 10 is clamped during a wet cycle, moving section 10b can be clamped to stationary section 10a under a specified clamping pressure (sometimes referred to as a tonnage). If the mold 10 is not held with adequate clamping pressure, the force of injection molding material can cause mold 10 to open slightly. A clamping pressure can be related to the area of the mating faces 18 and 19 of respective mold sections 10a and 10b.

However, during a dry cycle, e.g., during an initial set up, mold section 10a and 10b may not be clamped at a clamping pressure of the magnitude of a wet cycle clamping pressure.

Figure 10:
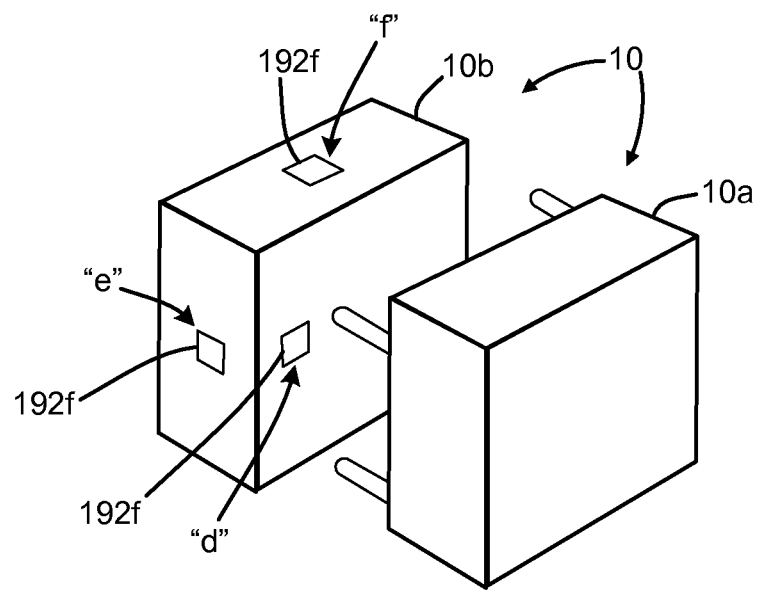
FIG. 10 is a second perspective view of a mold having various sensor units for sensing a clamping state of the mold.

In the case where sensor unit 192*a*, 192*aa*, 192*f*, 192*ff* is provided by a sensor unit outputting a variable amplitude signal that varies depending on the magnitude of clamping pressure, sensor units 192*a*, 192*aa*, 192*f*, 192*ff* can output the respective signals 392*a*, 392*aa*, 392*f*, 392*ff* as depicted in the dashed waveforms of FIGS. 11 and 12 and FIGS. 15 and 16. Such non-binary state signals can be processed for discriminating between wet and dry cycles, with higher peak amplitudes indicating wet cycles and lower peak amplitudes indicating dry cycles. Sensor unit 192*a* can be conveniently disposed at facing surface 18, e.g., a plate of mold section 10*a* as is best seen by sensor unit at location "a" in FIG. 9. However, sensor unit 192*a*, in one embodiment, can be a force sensor unit provided by a strain gauge disposed on a side surface of mold section 10*a* as shown by sensor unit 192*a* at location "b" and sensor unit 192*a* at location "b" as shown in FIG. 10. Sensor unit 192*f* can be disposed at a facing surface 19 of molding section 10*b* as shown by sensor unit 192*f* at location "b" in FIG. 10. However, in one embodiment, sensor unit 192*f* can be a force sensor unit provided by a strain gauge disposed at a side surface of mold section 10*b* as is indicated by sensor unit 192*f* at location "e" and sensor unit 192*f* at location "f." When a mold 10 is held under clamping pressure, an outer surface of mold section 10*a* and/or mold section 10*b* can experience deformation which deformation can be sensed with use of a strain gauge.

Sensor units 192*a*, 192*aa*, 192*b*, 192*c*, 192*d*, 192*e*, 192*f*, 192*ff*, 192*g* can comprise one or more sensor. Such one or more sensor can be an active sensor (e.g., a piezoelectric sensor) or a passive sensor (e.g., a strain gauge which can be, e.g., a foil type strain gauge or a piezoresistive strain gauge), a combination of one or more active sensor and one or more passive sensor. Where a sensor unit of sensor unit array 192 includes a strain gauge, the strain gauge can conveniently employ a Wheatstone Bridge configuration. A Wheatstone Bridge configuration can be particularly advantageous where it is desired to reduce a temperature affect on the sensor unit of sensor unit array 192. In one example, an active strain gauge can be deployed in association with an inactive strain gauge in a Wheatstone Bridge configuration. The inactive strain gauge can be disposed transverse to the applied strain so that strain has minimal affect on the inactive strain gauge. However, changes in temperature can be expected to affect both the active and inactive strain gauges similarly. Because temperature changes can be essentially identical in both gauges, the ratio of their resistance does not change, and the affects of temperature changes are minimized. In one embodiment, system 1000 can have more than or less than the number of sensor units depicted in FIGS. 2-4. For example, system 1000 can include a single one of sensor units 192*a*-192*g*.

With further reference to system 1000, system 1000 can include an injection molding assembly 100 which can be disposed in a work cell 100*c* of an injection molding facility 100*f* (FIG. 2). Injection molding assembly 100 can comprise injection molding machine 50 and mold 10, and a number of additional auxiliary injection molding assembly components including a dryer 60, a chiller 62 and a robot 64. Facility 100*f* can have a plurality of additional work cells 100*c* (not shown).

Figure 21:
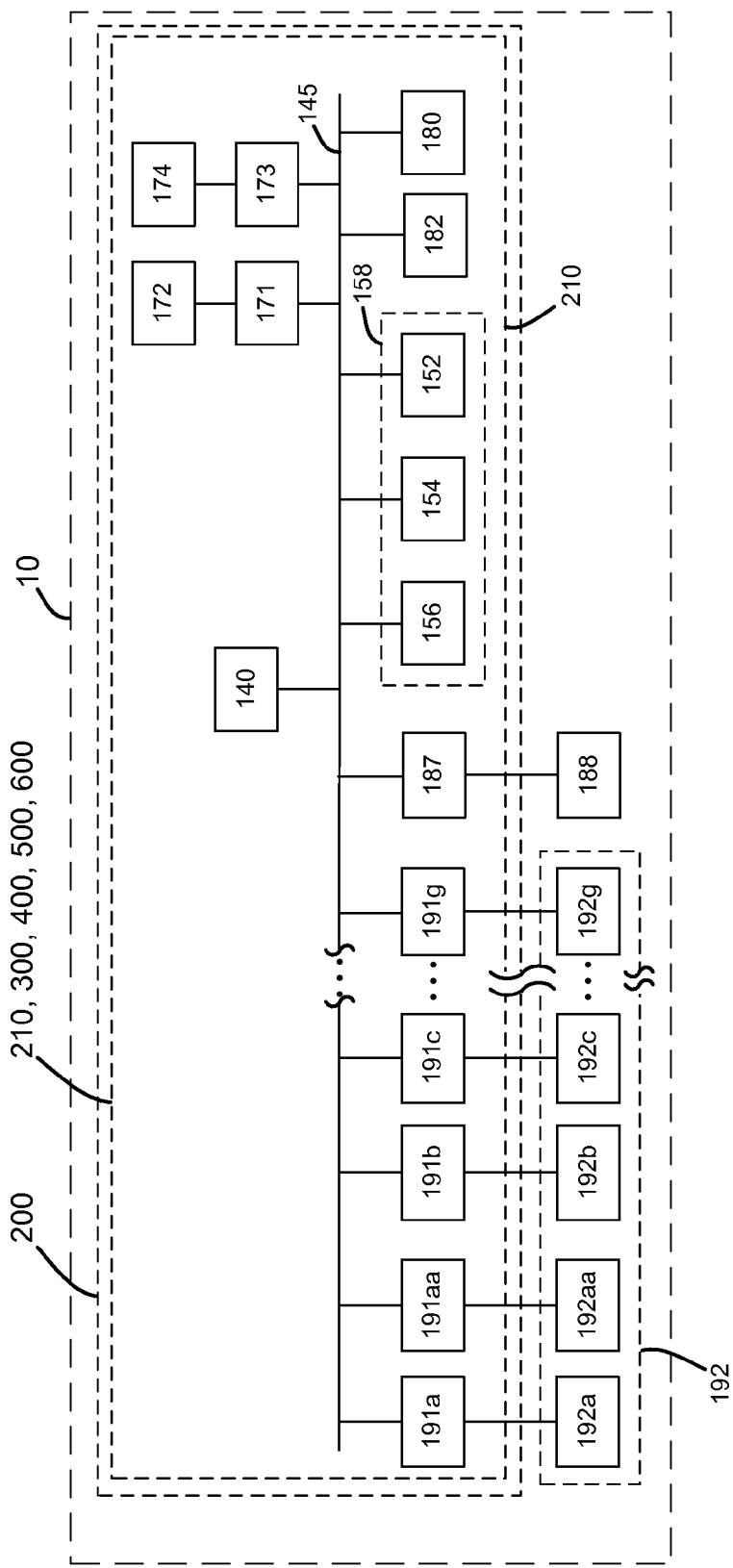
FIG. 21 is a schematic diagram for a processing circuit.

An exemplary block electrical diagram of mold 10 is shown and described in FIG. 21. Mold 10 can include an associated mold processing circuit 200 having processing circuit 210 which can comprise central processing unit (CPU 140) in communication with memory 158 which can include one or more of a system volatile memory 152, e.g., a RAM system non-volatile memory 154, e.g., ROM, and storage device 156. Storage device 156 can be provided e.g., by flash memory device, hard drive, floppy disk, or compact disk. Devices forming memory 158 can be regarded as devices that form a tangible computer readable storage medium. CPU 140 and memory 158 can be in communication via system bus 145. Mold processing circuit 200 including processing circuit 210 can also include a real time clock (RTC) 182. Mold 10 can further include communication I/O interface device 180 allowing network communication with more external computers. Communication I/O interface device 180 can be e.g., a wireline communication interface, e.g., an Ethernet or USB interface or a wireless communication interface e.g., an IEEE 802.11 interface or a Bluetooth interface.

Further regarding mold 10, mold processing circuit 200 including processing circuit 210 can include display 172 and a user input device 174, including, e.g. a keyboard and/or a pointer mechanism. Display 172 can be coupled with system bus 145 via interface 171 for communication with CPU 140. User input device 174 can be coupled to system bus 145 via interface 173 for communication with CPU 140. In one embodiment, user input device 174 can be deleted and display 172 can be provided by a touch screen display for providing functionality of user input device 174. Further regarding mold 10, mold 10 can comprise a sensor unit array 192 including one or more sensor units 192*a*-192*g*. Sensor units 192*a*-192*g* can be coupled to system bus 145 via interfaces 191*a*-191*g* for communication with CPU 140. In one embodiment, interfaces 191*a*-191*g* can include an array of registers in combination with appropriate circuitry for writing to the registers digitized sensor signals, the sensor signals generated by the various sensor units of the sensor unit array 192.

Figure 22:
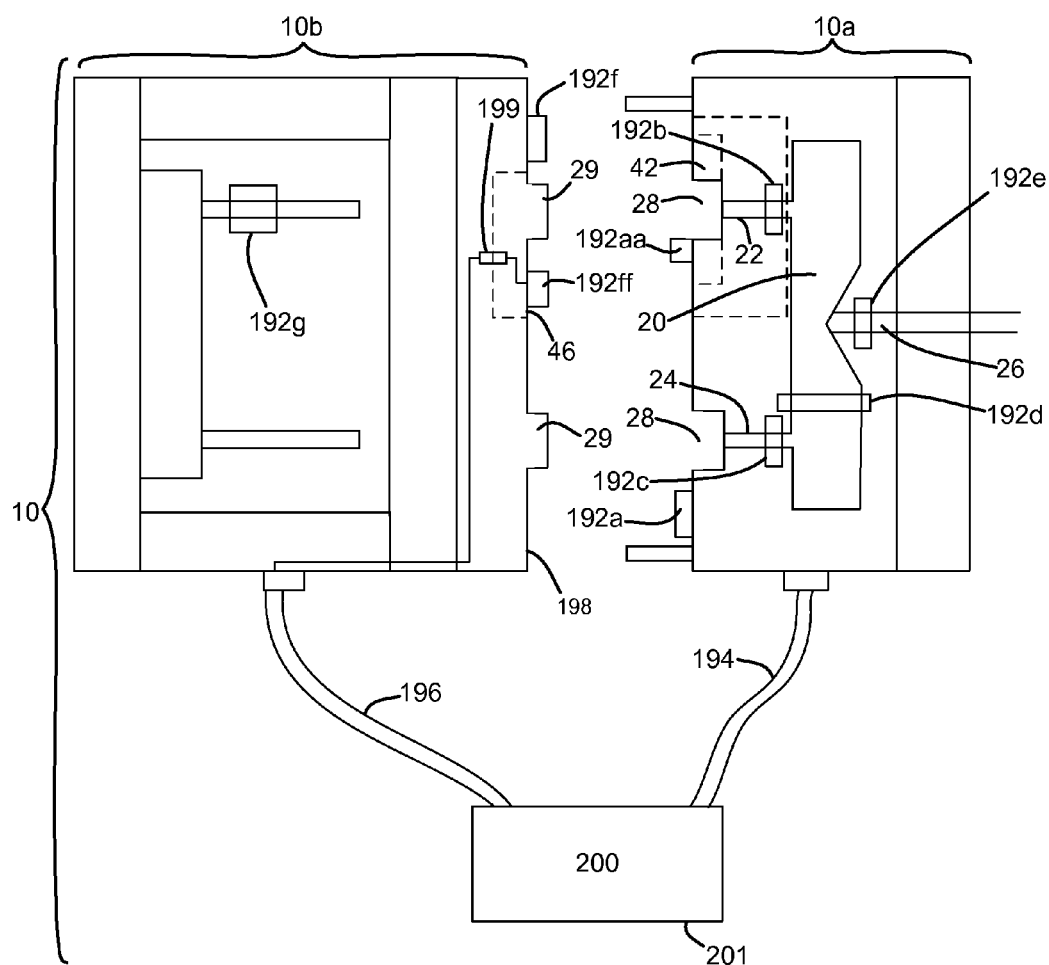
FIG. 22 is an electrical block diagram illustrating a mold having a mold processing circuit.

An exemplary integration scheme for the components of the block diagram of FIG. 21 is set forth in FIG. 22. Further regarding mold 10, mold 10 can further have an actuator assembly 188 comprising one or more actuator that can be coupled via interface 187 to system bus 145 for communication with CPU 140. Mold 10 can have actuator assembly 188, e.g., where mold processing circuit 200 is utilized for control of a mold 10. Injection molding machine 50 can include actuator assembly 188 e.g., where injection molding machine processing circuit 500 is utilized for control of an injection molding machine 50. Processing circuit 210 in the embodiment described includes a combination of a CPU 140 and memory 158 which can store one or more program for execution by and determining processing by CPU 140. In another embodiment processing circuit 210 can be provided by an analog signal processing circuit. In another embodiment, processing circuit 200 can be provided by an Application Specific Integrated Circuit (ASIC).

Referring to FIG. 22, mold processing circuit 200 having processing circuit 210 can be housed in a housing 201, e.g., a PC housing. Processing circuit 200 which can be regarded as part of mold 10, can be tethered to sensor units 192*a*-192*g* with one of cables 194, 196. Cable 194 can house conductors for transmission of signals e.g., 292*a*-292*e*. Cable 196 can house conductors for transmission of signals, e.g., 292*f*-292*g*. Conductors, e.g., conductor 198, can be provided for propagation of signals from sensor units of sensor unit array 192 to cables 194, 196. Breakable connectors, e.g., connector, 199 can be provided at the various parting lines between insert portions e.g., insert 46 and a base portion (major body portion) of a mold section e.g., section 10*b*.

Referring to further aspects of system 1000, injection molding assembly 100 can be in network communication with facility server 300 disposed within facility 100*f* but externally relative to work cell 100*c*. Server 300 can be in communication with server 400 via network 2000 as depicted in FIG. 2. System 1000 can also include client computer 600. Server 400 can be disposed at a location remote from facility 100f. System 1000 can further include a client computer 600 provided by, e.g., a desktop PC, a laptop PC, a smart phone, e.g., BLACKBERRY STORM by Research and Motion of Waterloo, Ontario.

Elements as shown in processing circuit 210 of FIG. 21 possibly without mold specific sensor unit interfaces 191a-191g, can be repeated (possibly to a different scale) in server 300, server 400, in injection molding machine processing circuit 500, and in client computer 600. Accordingly, processing circuit 210 of FIG. 21 is further labeled with the reference numerals 300, 400, 500, and 600. By virtue of their including at least a CPU 140 and an associated memory 158, each of mold processing circuit 200 injection molding machine processing circuit 500, server 400, and client computer 600, can be regarded as "computer" herein. Each computer of system 1000, e.g., 200, 300, 400, 500, 600 can be configured in accordance with the TCP/IP suite of protocols so that each computer of system 1000 is in IP network communication with each other computer of system 1000. Processing described as being performed by mold processing circuit 200 can be distributed for performance (partial performance or performance in the entirety) by computers 300, 400, 500, 600. Processing described as being performed by system 1000 can be performed by any computer 200, 300, 400, 500, 600, and/or can be distributed for performance by any combination of computers 200, 300, 400, 500, 600 herein.

Further regarding client computer 600, client computer 600 can be in TCP/IP communication with remaining computers of system 1000. In one embodiment, client computer 600 can include a communication I/O interface device 180 provided by one or more wireless communication interface and client computer 600 can be readily moved in and out of facility 100f while remaining in network communication with remaining computers of system 1000, e.g., server 300, server 400, and various computers of injection molding assembly 100, e.g., computer 200 for controlling mold 10, computer 500 for controlling injection molding machine 50. In one embodiment, client computer 600 can be wireline connected to a wireline network within facility 100f.

Figure 20:
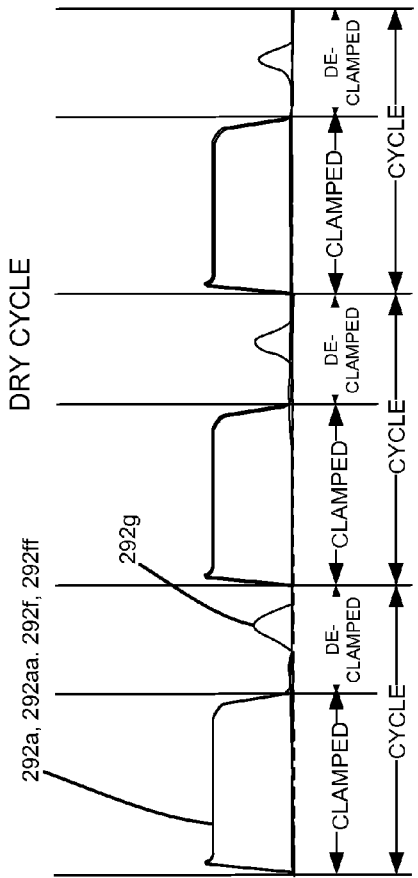

Reference is now made again to the flow diagram of FIGS. 20 and 21. In one embodiment, system 1000 can be operative so that signals 292a-292g output by sensor units 192a-192g are stored (recorded) in one or more memory of system 1000 over an entire history of mold 10. System 1000 can further be operative to store into one or more memory of system 1000, timestamp and identifier stamps associated to stored outputs of sensor units 192a-192g stored in one or more memory of system 1000. There can also be stored in one or more memory of system 1000 associated to the stored outputs of sensor units 192a-192g and the stored associated timestamps and identifier stamps data determined utilizing outputs of the one or more sensor units 192a-192g. Such data can be cycle counts as are set forth herein associated to each one or more sensor unit 192a-192g determined utilizing an output of one or more sensor units 192a-192g. Stored cycle counts stored into one or more memory which can be associated to each sensor unit 192a-192g, can have associated thereto, stored timestamps and stored identifier stamps stored into one or more memory of system 1000. In one embodiment, system 1000 can be operative so that mold processing unit 200 performs a storing of time stamped and identifier stamped raw signal and cycle count outputs of sensor units 192a-192g for an entire history of mold 10 by storing the time stamped and identifier stamped outputs into a memory 158 of mold processing unit 200. Mold processing unit 200 can transmit the content of memory 158 of mold processing unit 200 for replication of the content in memories 158 of each of computers 300, 400, 500 and 600.

Figure 23:
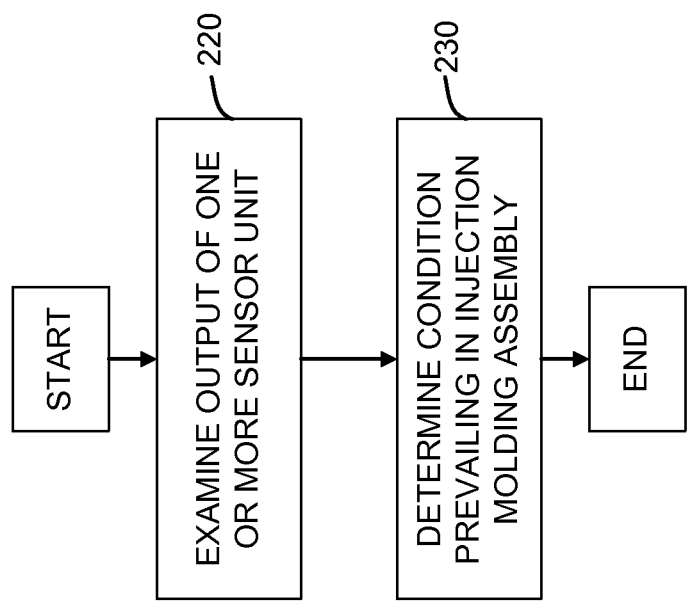

In another aspect, system 1000 can be operative to perform the method described in the flow diagram of FIG. 23. At block 220 system 1000 can examine an output of one or more sensor unit of sensor unit array 192. At block 230 system 1000 can determine a condition prevailing in system 1000 based on the examination at block 230. The determined condition can be a cycle count of one or more component of a mold 10. In the embodiment described with reference to the flow diagram of FIG. 24 system 1000 can be further operative to output an indicator indicative of the determined condition determined at block 230. Regarding the flow diagrams of FIGS. 23 and 24, the examination of an output of one or more sensor unit at block 230 can comprise examination of raw data output from one or more sensor unit e.g., in analog or digitized format or can comprise an examination of data determined utilizing a raw data output from the one or more sensor unit, e.g., can comprise examining a cycle count output of a cycle counter.

Referring to a cycle count which can be determined by system 1000 at block 220, a determined cycle count can be, e.g., a wet cycle count, a dry cycle count or a total cycle count.

For determination of a cycle count of a mold component based on an examination of an output of a clamping state sensor unit 192a, 192aa, 192f, 192ff system 1000 can increment a counter each time the amplitude of the clamping state signal 292a, 292aa, 292f, 292ff exceeds a threshold where sensor units 192a, 192aa, 192f, 192ff output binary state signals. Such a cycle count can be regarded as a total cycle count for the reason that the clamping state sensor unit 192a, 192aa, 192f, 192ff when outputting a binary state signal do not output a signal that can be processed for discriminating between wet cycles and dry cycles. However, where sensor units 192a, 192aa, 192f, 192ff output an amplitude varying signal 392a, 392aa, 392f, 392ff varying depending on a magnitude of sensed force, system 1000 can process the output signals thereof for discriminating between wet cycles and dry cycles. Specifically, system 1000 can be operative to increment a wet cycle counter each time an amplitude varying signal (dashed signal 392a, 392aa, 392f, 392ff) exceeds a first higher threshold and can be operative to increment a dry cycle counter each time the amplitude varying signal (392a, 392aa, 392f, 392ff) exceeds a second lower threshold without exceeding the first higher threshold, and can be operative for determining a total cycle count utilizing sensor units 192a, 192aa, 192f, 192ff by incrementing the wet cycle count by the dry cycle count.

For determining of a wet cycle count of a mold component based on an examination of output of a sensor unit 192b, 192c, 192d, 192e disposed to sense whether there is a flow of fluid through stationary section 10a, system 1000 can be operative to increment a counter each time an amplitude of an output signal 292b, 292c, 292d, 292e exceeds a threshold. For determining of a dry cycle count based on an output of a sensor unit or sensor unit array 192 disposed to sense whether there is a flow of fluid through stationary section 10a system 1000 can be operative to increment a counter each time an amplitude of an output signal 292b, 292c, 292d, 292e does not exceed the threshold with the clamping state of the mold being in a clamped state that is intermediate of un-clamped periods. A clamped state of mold 10 can be determined as set forth herein by examining an output of a clamping state sensor unit such as sensor unit 192a, 192aa, 192f, 192ff disposed to sense a clamping state of mold, or alternatively, by examination of another state signal that indicates a clamping sate of mold 10, such as state signal that indicates a state of an actuator that moves the mold 10 between clamped and declamped states. For determining a total cycle count based on an output of a sensor unit 192*b*, 192*c*, 192*d*, 192*e* disposed to sense whether there is a flow of fluid through stationary section 10*a*, system 1000 can increment the wet cycle count by the dry cycle count.

For determining a wet cycle count based on an output of a sensor unit 192*g* disposed to sense whether a finished part has been ejected, system 1000 can be operative to increment a cycle counter each time an amplitude of a signal 292*g* exceeds a first threshold indicative of an ejector event. For determining of a dry cycle count based on an output of a sensor unit 192*g* disposed to sense whether a finished part has been ejected, system 1000 can be operative to increment a cycle counter each time an amplitude of a signal 292*g* exceeds a second threshold of lower amplitude than the first threshold and being indicative of an ejector being actuated with no finished part being retained by a core of moveable section 10*b*. For determining a total cycle count based on an output of a sensor unit 192*g* disposed to sense whether a finished part has been ejected, system 1000 can be operative to increment the wet cycle count by the dry cycle count.

Referring to block 240, system 1000 can be operative to output an indicator indicative of a condition determined at block 230. Such output can comprise display of indicators on a display 172 of a determined condition determined at block 230. In the example described with reference to FIG. 28, system 1000 for performance of block 240 can present schematic diagram i10 corresponding to mold 10. Further within diagram i10 there is depicted sensor unit indicators i192*a*, i192*aa*, i192*b*, i192*c*, i192*d*, i192*e*, i192*f*, i192*ff*, i192*g*, corresponding to each respective sensor unit 192*a*-192*g* of sensor unit array 192 in a location on diagram i10 indicating its actual location at the actual mold 10.

System 1000 can be operative to display with reference to each sensor unit indicator i192*a*-i192*g*, wet cycle, dry cycle and total cycle counts as determined utilizing an output of each respective sensor unit of mold 10 disposed for cycle counting. Such display can be constant or temporary, (e.g., on a "mouse over" basis).

Figure 28:
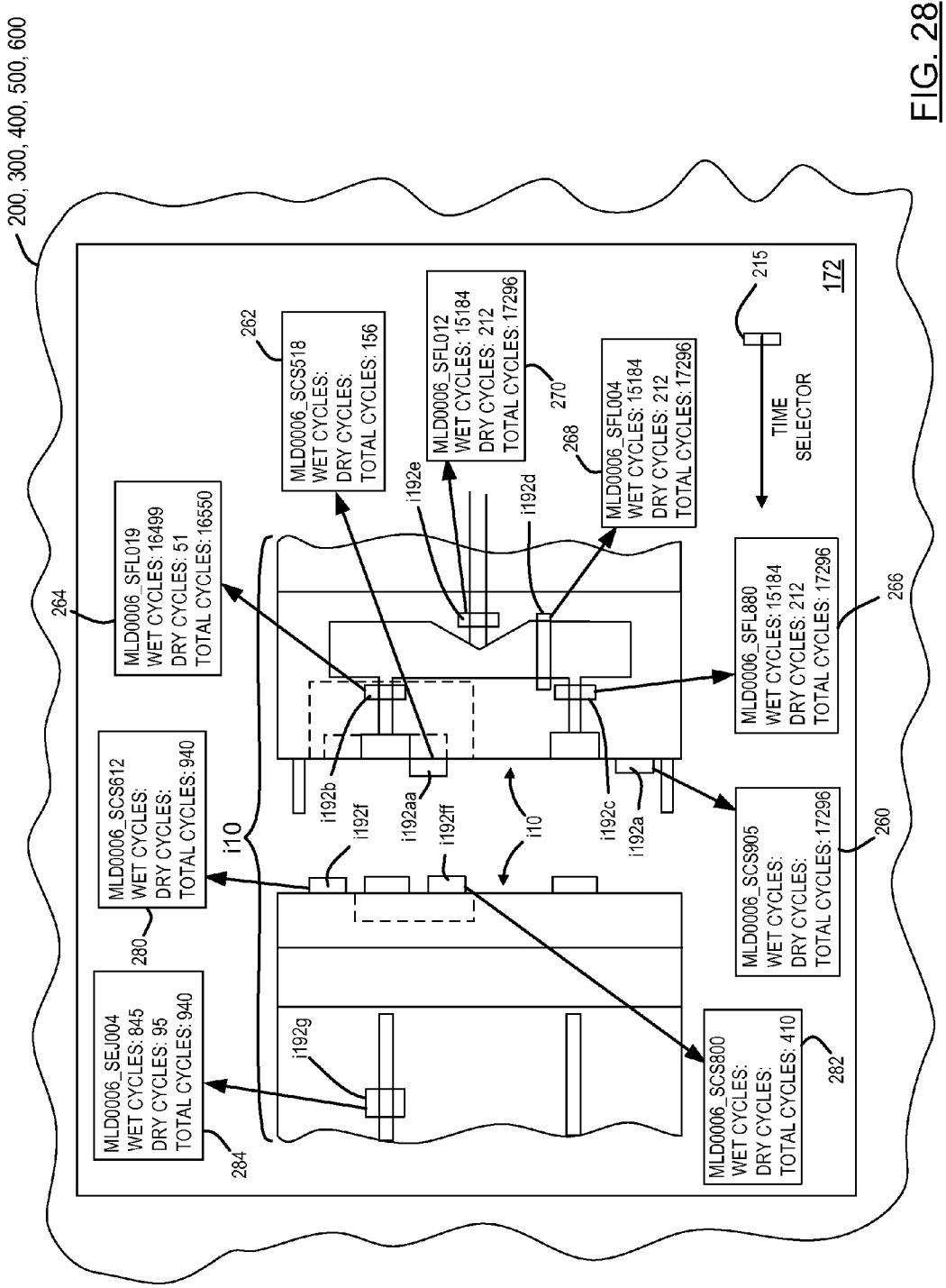
FIG. 28 is a user interface display illustrating exemplary indicators that can be output.

An exemplary display that can be displayed on display 172 by execution of a condition determining program is presented in FIG. 28. The display shown by FIG. 28 can be displayed by a display 172 of one or more of the apparatuses provided by computers 200, 300, 400, 500, 600.

The display of FIG. 28 presents indications of conditions prevailing in system 1000 the conditions being in the form of cycles performed by mold 10. System 1000 can be configured so that system 1000 can discriminate whether a wet cycle or a dry cycle as been performed and can further discriminate which component (e.g., stationary section 10*a*, moveable section 10*b* or a modular portion e.g., portion 42, 44, 46, 48 of the section) was involved in performance of a cycle. Where stationary section 10*a* is of modular construction, "stationary section 10*a*" can refer to the base portion (major body portion) of the stationary section 10*a*, i.e., the portion excluding any inserts. Where moveable section 10*b* is of modular construction "moveable section" can refer to the base portion (major body portion) of the moveable section 10*b* excluding any inserts.

In another aspect with reference to FIG. 28 display 172 can display a timeline actuator 215. System 1000 can be operative so that by moving actuator 215 e.g., with use of a pointer mechanism of an input device 174, system 1000 for performance of block 240 displays indicators indicating a configuration of mold 10 at a previous point in time. The indicators can comprise identifiers for various sensor units and accumulated cycle counts as of the selected past time selected with use of actuator 215. For enabling the indication of a historical record as described in connection with FIG. 28 the determining at block 230 can comprise determining a historical record of past mold configurations. For enabling system 1000 to determine a historical record of past mold configurations at block 230, system 1000 can be established so that with sensor data output from one or more sensor unit of sensor unit array 192 for storage into one or more memory of system there is output a timestamp that timestamps the output data and an identifier that associates an identifier to the data. Accordingly, when system 1000 increments a counter, system 1000 can associate a timestamp to the time of the new count. By associating a timestamp to each cycle count maintained for each sensor unit of sensor unit array 192 there can be associated to each arbitrarily selected past time which can be selected with use of actuator 215 an associated one or more cycle count (e.g., wet cycle count, dry cycle count, total cycle count) for that selected time for each sensor unit of sensor unit array 192. System 1000 can be operative so that for each increment of a cycle counter for a given sensor unit there is associated to the count a timestamp as well as a sensor unit identifier, so that the identifier is recoverable by keying with use of the timestamp and vice versa. Accordingly, by keying a record database maintained by one or more memory 158 of system 1000 with use of a timestamp there can be recovered for the timestamp the set of identifiers indicating the mold components at the time of the timestamp as well as the accumulated one or more cycle counts associated to each of several components of mold component as of the time of the timestamp. In one aspect, sensor unit identifiers of sensor units 192*a*-192*g* can serve as identifiers for the mold component at which they are disposed. Accordingly, storing a record of a sensor unit output, e.g., raw or in the format of a cycle count, there is maintained a record of the cycle count of the mold component, e.g., stationary section 10*a* base portion, stationary section 10*a* insert portion, a moveable section 10*b* base portion, a moveable section insert portion, on which the sensor unit (e.g., sensor unit 192*a*, 192*aa*, 192*b*, 192*c*, 192*d*, 192*e*, 192*f*, 192*ff*, 192*g*) is disposed.

For providing time stamping, system 1000 can include a real time clock 182 (FIG. 2) and can stamp data output by sensor units with timestamps determined with use of the real time clock. Identifiers for sensor units 192*a*-192*g* and their associated mold components can conveniently include mnemonic characters, as are indicated in FIG. 28 that allow their characteristics to be determined based on human visual observing of the mnemonic, e.g., "CS" for clamping state, "FL" for flow determining, "EJ" for ejector detecting.

Referring to FIG. 28 wherein indicators for a current state of mold 10 are indicated, it is demonstrated that the simple display of cycle counts for the various mold components yields useful and robust information about a mold 10. For example, viewing the current cycle count indicators 260, 266, 268, 270 for sensor units (e.g., sensor units 192*a*, 192*c*, 192*e*, 192*f*) with the cycle count indicators 280, 282, 284 for sensor units 192*f*, 192*ff*, 192*g* (which can be simultaneously displayed with the indicators 280, 282 and 284), it is seen for the particular example that while a base component of mold section 10*a* can be an original component, components 10*b* (base portion) associated to sensor unit 192*f* and sensor unit 192*g*, as well as insert 46 corresponding to sensor unit 192*ff* indicated by indicator i192*ff* have been replaced since the time of original deployment of mold 10.

It can been seen observing the view of FIG. 28 that if actuator 215 were scrolled to indicate a prior time, the identifier indicators for sensor units 192*f*, 192*ff*, 192*g* and accordingly their associated mold components would eventually change by virtue of there not being original components. In another aspect, a condition determined at block 230 (FIG. 24) can be a maintenance schedule for a mold component and an output indicated at block 240 (FIG. 24) can be an indication of a scheduled maintenance of a mold component. In one aspect, system 1000 can be operative to determine that a maintenance servicing is due for one or more mold component, e.g., stationary section component 10*a* (base portion), moveable section component 10*b* (base portion), insert 46 responsively to a cycle count associated to the component. For example, system 1000 can be operative to determine that a maintenance servicing is due for a certain component if a number of counts for the certain component exceeds a threshold that can be associated to the component and stored in one or more memory of system 1000. System 1000 can be operative so that system 1000 outputs as an indicator e.g., by displaying one or more areas 260, 262, 264, 266, 268, 270, 280, 282, and 284 in a different style e.g., flashing of different color, if system 1000 determines that a maintenance servicing is currently due for the indicated mold component that is indicated by the area. Further, system 1000 can be operative to display in one or more of areas 260, 262, 262, 268, 270, 280, 282, and 284 an indicator of scheduled maintenance servicing time for the mold component indicated by the respective area.

With reference to FIG. 28, it is shown that while data determined with use of methods set forth herein can be utilized for indicating a condition prevailing within system 1000 data determined utilizing an examination of one or more sensor unit output can also be utilized for process control. In one embodiment, a result of an examination can be output to a process control interface.

Figure 25:
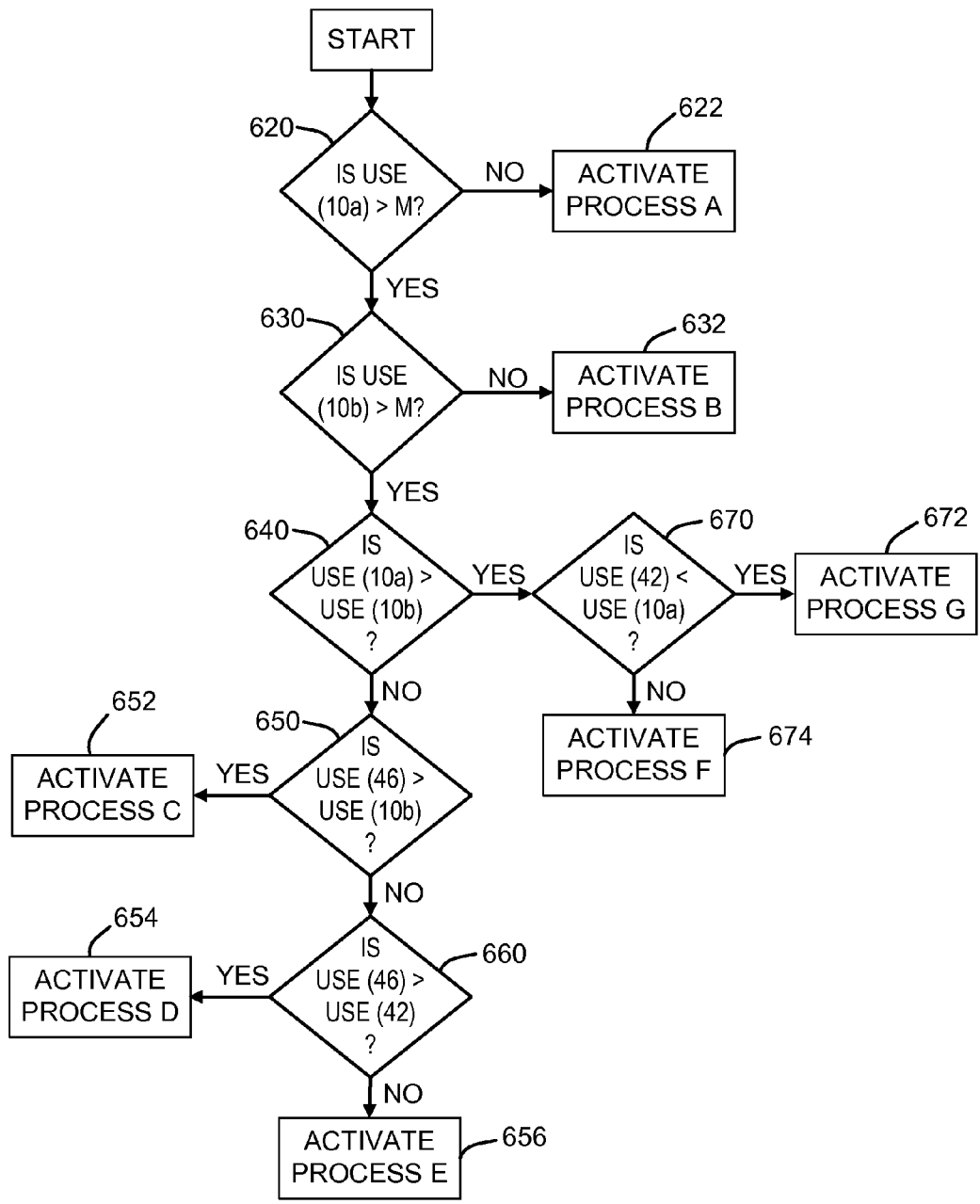

With reference to the flow diagram of FIG. 25, system 1000 can perform a method whereby a certain process is activated responsively to a determining of a measurement of use performed with reference to one or more component of mold 10. In one example, a use level (use level parameter) can be determined for a particular mold component of mold 10 by way of maintaining a cycle count for the mold component. As has been set forth herein, a sensor unit associated with a certain mold component can have a certain identifier and that identifier can serve as an identifier for the component at which the sensor unit is disposed. Further methods have been set forth herein for determining a cycle count corresponding to a certain one of sensor units 192*a*-192*g* of sensor unit array 192.

Referring to FIGS. 2-4, it has been described that mold 10 can be regarded as having at least a first component provided by base portion of mold section 10*a*, a second component provided by a base portion of mold section 10*b*, modular insert portion provided by insert 42, and a fourth component provided by modular insert portion, 46 e.g., insert portion. An output of sensor units 192*a*, 192*b*, 192*c*, 192*d*, 192*e*, can be utilized to determine a cycle count for a base portion of mold section 10*a* while an output of sensor unit 192*f* and sensor unit 192*g* can be utilized for determining a cycle count for a base portion of mold section 10*b*. Sensor unit 192*aa* can be utilized for determining a cycle count for modular insert portion 42 while an output of sensor unit 192*f* can be utilized for determining a cycle count for modular insert portion 46. The above noted cycle count can be regarded as measurements of use (use level parameters) for the above noted mold components.

Referring to the flow diagram of FIG. 25, differentiated processes can be activated depending on a measurement of use determined for one or more component of mold 10. At Block 622 process A can be activated. At block 632, process B can be activated. At block 652, process C can be activated. At block 654, process D can be activated. At block 656, process E can be activated. At block 672, process G can be activated. At block 674, process F can be activated. The particular process that can be activated can be responsive to determined use level parameter for one or more mold component in accordance with the process flow depicted in the flow diagram of in FIG. 25. At block 620, system 1000 can determine whether a use level of component 10*a* (the base portion thereof) is greater than a threshold. At block 630, system 1000 can determine whether a use level of a base portion of mold section 10*b* is greater than a threshold. At block 640, system 1000 can determine whether a use level of a base portion of mold section 10*a* is greater than a use level of a base portion of the mold section 10*b*. At block 650, system 1000 can determine whether a use level of insert component 46 is greater than a use level of a base portion of mold section 10*b*. At block 660, system 1000 can determine whether a use level of the mold insert portion 46 is greater than a use level of the mold insert portion 42. At block 670, system 1000 can determine whether a use level of the modular insert portion 42 is less than a use level of base portion of stationary mold section 10*a*.

Referring still to the flow diagram of FIG. 25, the various processes depicted, i.e., processes A, B, C, D, E, F, and G can be differentiated. Referring again to FIG. 21, it is seen that processing circuit 210 can comprise actuator assembly 188 in communication with system bus 145 via interface 187. Where processing circuit 210 is provided for use with a mold, actuator assembly 188 can comprise actuators controlling various mold components, e.g., valves and gates thereof. Where actuator assembly 188 is provided as part of a processing circuit for controlling an injection molding machine, actuator assembly 188 can include actuators controlling components of an injection molding machine e.g., the screw and heater elements in a feed path.

Referring again to the flow diagram of FIG. 25, processes A-G in one embodiment can be processes performed by mold processing circuit 200 for control of one or more component of the mold during a cycle. In another embodiment, processes A-G are processes that are activated by injection molding machine processing circuit 500 for control of an injection molding machine 50 during a cycle. As seen with reference to the flow diagram of FIG. 25, a mold control process performed by mold processing circuit 200 and/or an injection molding machine process performed by injection molding machine 50 can be responsive to a determined level of use of one or more component of mold 10.

Figure 24:
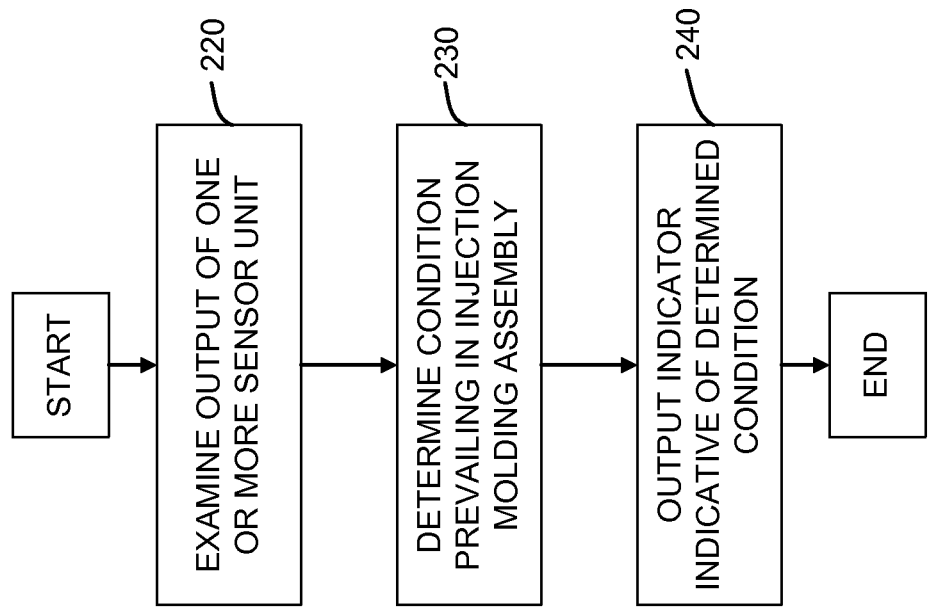
FIGS. 23-27 are flow diagrams illustrating methods that can be performed by one or more processing circuit.

Regarding the methods described with reference to FIGS. 23-25 the methods can be executed by a processing circuit 210 of system 1000 and conveniently by a processing circuit 210 of mold 10 (i.e., mold processing circuit 200). However, the methods can also be performed by another processing circuit 210 of system 1000 such as a processing circuit 210 of computer 300, computer 400, computer 500, and computer 600. Also, the methods of FIGS. 23 and 24 can be performed by more than one proceeding circuit 210, e.g., in a distributive processing environment.

Where processing circuit 210 includes a CPU 140 or other processor capable of executing computer program instructions, computer program instructions can be provided that are executable by the processor for performance of the methods described in the flow diagrams of FIGS. 23-25. Such computer program instructions can be stored on a computer readable medium. A computer readable medium can be provided, e.g., by one or more memory device of a memory, e.g., memory 158 associated to a processor, e.g., CPU processor 140 for executing the instruction. A computer readable medium can comprise memory devices of first and second externally disposed computers, e.g., first and second ones of computers 200, 300, 400, 500, 600. A computer readable medium can comprise a computer readable medium external to a processor for executing the instructions, e.g., a memory of an external server having a file system that stores program files for deployment to one or more computer of system 1000. There is set forth herein a computer readable storage medium readable by a processor and storing instructions for execution by the processor of the method set forth in the flow diagrams of FIGS. 23-25. In an alternative embodiment, a method set forth in the flow diagram of FIGS. 23-25 can be executed by more than one processor in accordance with a distributive processing method. The more than one processor can comprise processors of different computers e.g., CPUs of different ones of computers 200, 300, 400, 500, 600, and/or the more than one processor can comprise processors of a common computer, e.g., CPU 140 and a processor of an interface microcontroller of the common computer.

In one embodiment, system 1000 can be utilized in a production based customer invoicing system. In a production based customer invoicing system, an entity that can be the owner of mold 10 can charge a customer that uses the mold 10 within facility 100f based on the use of the mold to manufacture an output product.

Figure 26:
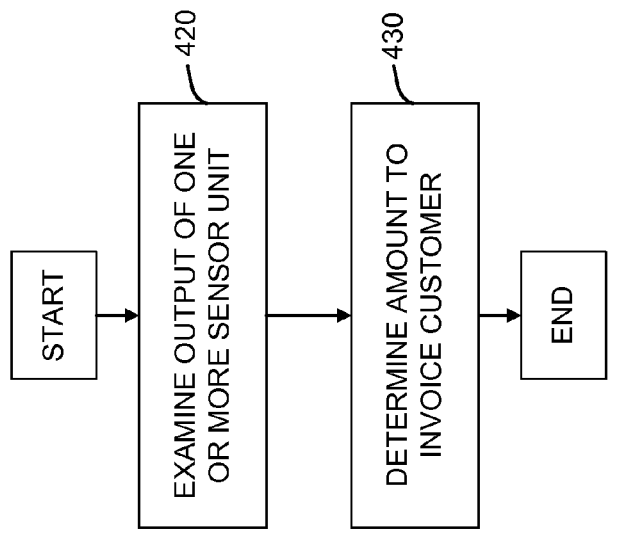

Referring to the flow diagram of FIG. 26, system 1000 at block 420 examines an output of one or more sensor unit 192a-192g of sensor unit array 192, and at block 430 determines an amount to invoice a customer based on the examination performed at block 420. In the variation of the method of FIG. 26 that is set forth in FIG. 27 a method performed by system 1000 can further include outputting an invoice to a customer. Such output can include electronic transmission to an electronically addressable address of the customer (an automated billing server address, email address), or output of a paper invoice. Regarding the flow diagram of FIGS. 26-27, the examination of an output of one or more sensor unit 192a-192g at block 420 can comprise examination of raw data output from one or more sensor unit e.g., in analog or digitized format or can comprise an examination of data determined utilizing a raw data output from the one or more sensor unit (e.g., can comprise reading of a counter output).

In one embodiment the method described in connection with the flow diagrams FIGS. 26-27 and particularly the determining function block 430 thereof can be performed in such manner that a customer is not invoiced, e.g., for testing or performance of maintenance of mold or otherwise activity of which customer complains or dissatisfaction might arise. For example, it has been mentioned that an output of a clamping state sensor unit in one embodiment for sensing a clamping state may not be useful for discriminating between wet cycles and dry cycles. In the development of system 1000 it was determined that invoicing a customer based on a cycle count as determined by examination of a clamping state sensor may result in customer complaint and dissatisfaction for the reason that dry cycles may not be regarded as an appropriate measure of product output utilizing the mold.

In one example of a performance of examining block 420 system 1000 examines an output of a sensor unit, e.g., sensor unit 192b, 192c, 192d, 192e disposed internally relative to a stationary section 10a of a mold 10 and configured for determining whether there is a flow of fluid through stationary mold section 10a. By examining an output of a sensor unit 192b, 192c, 192d, 192e, a wet cycle count can be determined at block 430 in the manner described with reference to the flow diagram of FIG. 23 which is not affected by dry cycles and in which dry cycles and wet cycles are discriminated. A determination at block 430 can further comprise determining an amount of an invoice according to a schedule based on number of wet cycles. In such manner, a determination of an amount to invoice is not influenced by dry cycles.

In another example of a performance of examining block 420, system 1000 can examine an output of a sensor unit 192g configured for determining whether a finished part formed by the operation of mold 10 is ejected from mold 10. By examining an output of a sensor unit 192g at block 420, a wet cycle count can be determined at block 430 in the manner described with reference to the flow diagram of FIG. 23 in connection with the description of sensor unit 192g, which is not affected by dry cycles and in which dry cycles and wet cycles are discriminated. A determination at block 430 can further comprise determining an amount of an invoice according to a schedule based on a number of wet cycles. In such manner, a determination of an amount to invoice is not influenced by dry cycles.

Figure 27:
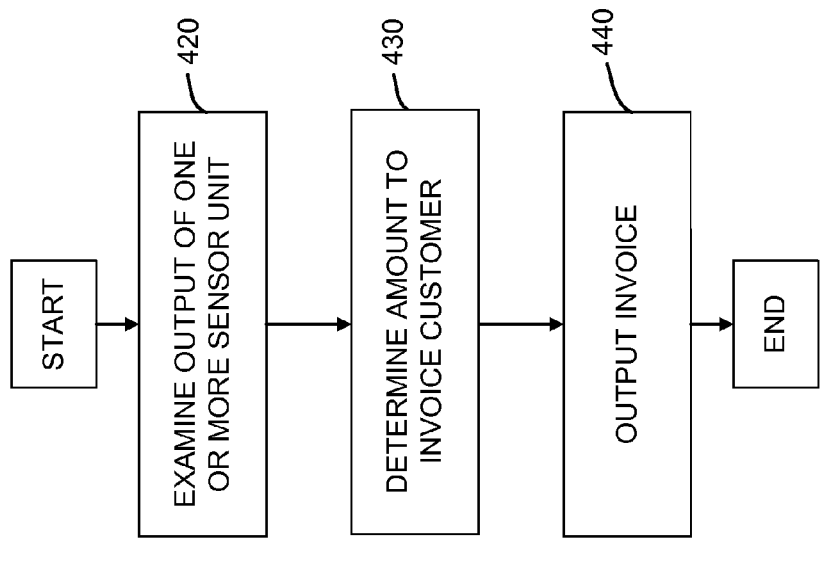

In another example of performance of examining block 420 (FIG. 26, FIG. 27), system 1000 can examine an output of a plurality of sensor units. The examination of outputs of a plurality of sensor units can comprise independently determining a cycle count utilizing each of the plurality of outputs and selecting the lowest count as the true cycle count or refraining from outputting a count and presenting an indicator if a count determined utilizing a first sensor unit does not coincide with a count determined utilizing a second sensor unit. The plurality of sensor units can comprise sensor units of a common mold section 10a or 10b, or from different mold sections 10a and 10b. The plurality of sensor units can comprise two or more sensor units. The plurality of sensor units in one particular example can comprise a first sensor unit provided by a sensor unit, e.g., sensor unit 192b disposed internally of mold section 10a for sensing whether there is a flow of fluid through stationary mold section 10a and a second sensor unit provided by sensor unit 192g configured for sensing an ejector event. Examination at block 420 can comprise determining a cycle count utilizing an output of a sensor unit disposed for sensing whether there is a flow of injection molding material fluid through stationary section 10a and of sensor unit 192g and the determining at block 430 can comprise determining an amount to invoice a customer based on the lower cycle count, thereby providing assurance to a customer that customer is being invoiced based on output product utilizing mold 10 and not for testing maintenance or other activities involving mold 10 not related to an output of product. Also or alternatively, system 1000 can refrain from presenting a cycle count for determining an invoice and can output an indicator if cycle counts determined utilizing two different sensor units do not coincide.

Where processing circuit 210 includes a CPU 140 or other processor capable of executing computer program instructions, computer program instructions can be provided that are executable by the processor for performance of the methods described in the flow diagrams of FIGS. 26-27. Such computer program instructions can be stored on a computer readable medium. A computer readable medium can be provided, e.g., by one or more memory devices of a memory, e.g., memory 158 associated to a processor, e.g., CPU processor 140 for executing the instructions. A computer readable medium can comprise memory devices of first and second externally disposed computers, e.g., one or more of computers 200, 300, 400, 500, 600. A computer readable medium can also comprise a computer readable medium external to a processor for executing instructions, e.g. a memory of an external server having a file system that stores program files for deployment to one or more computer of system 1000. There is set forth herein a computer readable storage medium readable by a processor and storing instructions for execution by the processor of the method set forth in the flow diagrams of FIGS. 26 and 27. In an alternative embodiment, a method set forth in the flow diagrams of FIGS. 26 and 27 can be executed by more than one processor in accordance with a distributive processing method. The more than one processor can comprise processors of different computers e.g., CPUs of different ones of computers 200, 300, 400, 500 and 600, and/or the more than one processor can comprise processors of a common computer, e.g., CPU 140 and a processor of an interface microcontroller of the common computer.

A small sample of systems methods and apparatus that are described herein is as follows:

A1. A system comprising:
  a injection molding assembly mold having a stationary section and moveable section, the stationary section having a channel assembly and one or more nozzle, the mold further having a sensor unit array, the sensor unit array comprising one or more sensor unit;
  wherein the sensor unit array includes one or more sensor unit disposed at the stationary section of the mold and one or more sensor unit disposed at the moveable section of the mold;
  one or more processing circuit that utilizes an output of the one or more sensor unit disposed at the stationary section of the mold for determining a cycle count of one or more component of the mold, and that utilizes an output of the one or more sensor unit disposed at the moveable section of the mold for determining a cycle count of one or more component of the mold.

A2. The system of A1, wherein the one or more sensor unit disposed at the moveable section of the mold is a sensor unit disposed to sense whether a molded part has been ejected from the mold.

A3. The system of A1, wherein the one or more sensor unit disposed at the moveable section of the mold is a contact switch disposed to sense whether there has been a clamping of the moveable section to the stationary section.

A4. The system of A1, wherein the one or more sensor unit disposed at the stationary section of the mold includes one or more sensor unit disposed internally of the stationary section, wherein the processing circuit utilizes an output of the one or more sensor unit disposed internally of the stationary section for determining a cycle count of one or more component of the mold.

A5. The system of A1, wherein the one or more processing circuit records a cycle count for one or more component of the moveable section of the mold and separately records a cycle count for one or more component of the stationary section of the mold, the system being operative for display of the cycle count for the one or more component of the moveable section, the system being operative for display of the cycle count for the one or more component of the stationary section.

B1. A system comprising:
  a injection molding assembly mold having a stationary section and moveable section, the stationary section having a channel assembly and one or more nozzle, the mold further having a sensor unit array, the sensor unit array comprising one or more sensor unit;
  wherein the sensor unit array includes one or more sensor unit disposed at the moveable section of the mold for sensing whether a molded part has been ejected from the mold;
  one or more processing circuit operative for utilizing an output of the one or more sensor unit, the utilizing comprising determining a cycle count of one or more component of the mold.

B2. The system of B1, wherein the one or more sensor unit disposed for sensing whether a molded part has been ejected from the mold includes a force sensor unit disposed at an ejector assembly, the force sensor unit outputting an amplitude varying signal that outputs a signal of relatively higher peak amplitude when the ejector assembly is actuated with a part held within the moveable section, and outputs a signal of relatively lower peak amplitude when the ejector assembly is actuated with a part not held within the moveable section.

B3. The system of B1, wherein the one or more sensor unit disposed at the moveable section of the mold includes one or more contact switches disposed to sense whether there has been a clamping of the moveable section to the stationary section.

B4. The system of B1, wherein the sensor unit array further includes one or more sensor unit disposed at the stationary section of the mold, wherein the processing circuit utilizes an output of the one or more sensor unit disposed at the stationary section for determining a cycle count of one or more components of the mold.

B5. The system of B1, wherein the one or more processing circuit records a cycle count for the moveable section of the mold and separately records a cycle count for the stationary section of the mold, the system being operative to display the cycle count for the moveable section, the system being operative to display the cycle count for the stationary section.

C1. A system comprising:
  a injection molding assembly mold having a stationary section and moveable section, the stationary section having a channel assembly and one or more nozzle, the mold further having a sensor unit array, the sensor unit array comprising one or more sensor unit disposed at the injection molding assembly mold, the one or more sensor unit including one or more sensor unit disposed internally of the stationary section;
  one or more processing circuit that utilizes an output of the one or more sensor unit disposed internally of a stationary section for determining a cycle count of one or more component of the mold.

C2. The system of C1, wherein the one or more sensor unit includes one or more sensor unit disposed for sensing whether there is a flow of fluid through the stationary section.

C3 The system of C1, wherein the one or more sensor unit includes temperature sensor unit.

C4 The system of C1, wherein the one or more sensor unit is of a sensor unit type selected from a force sensor unit, a pressure sensor unit, a temperature sensor unit, an accelerometer and a flow meter unit.

C5. The system of C1, wherein the one or more processing circuit is operative to discriminate between a wet cycle and a dry cycle utilizing the output of the one or more sensor unit.

C6. The system of C1, wherein the one or more sensor unit includes a force sensor unit provided by a strain gauge disposed at a location selected from the group consisting of adjacently along or about an external surface of a nozzle, adjacently along or about an external surface of a channel, adjacently along or about an external surface of an inlet.

D1. A system comprising:
  a injection molding assembly mold having a stationary section and moveable section, the stationary section having a channel assembly and one or more nozzle, the mold further having a sensor unit array, the sensor unit array comprising one or more sensor unit disposed at one or more of the stationary section and the moveable section of the injection molding assembly mold;
  one or more processing circuit that utilizes an output of the one or more sensor unit for determining a cycle count for one or more component of the mold, wherein the one or more processing circuit is operative to discriminate between a wet cycle and a dry cycle of the one or more component of the mold utilizing the output of the one or more sensor unit.

D2. The system of D1, wherein the system is operative to output an indicator indicative of a result of the determining.

D3. The system of D1, wherein the system is operative to output a result of the determining to a process control interface.

D4. The system of D1, wherein the determining includes determining a wet cycle count and a dry cycle count for the stationary section.

D5. The system of D1, wherein the determining includes determining a wet cycle count and a dry cycle count for the moveable section.

D6. The system of D1, wherein the sensor unit array includes a first sensor unit disposed at a first mold component provided by a base portion of a mold section and wherein the sensor unit array further includes a second sensor unit disposed at a second mold component provided by a modular portion of the mold section, wherein the determining includes utilizing an output of the first sensor unit for determining a cycle count of the first mold component and utilizing an output of the second sensor unit for determining a cycle count of the of the second mold component.

D7. The system of D1, wherein the sensor unit array includes a first sensor unit disposed at the stationary section and wherein the sensor unit array further includes a second sensor unit disposed at the moveable section, wherein the determining includes utilizing an output of the first sensor unit for determining a cycle count of the stationary section and utilizing an output of the second sensor unit for determining a cycle count of the of the moveable section.

D8. The system of D1, wherein the one or more sensor unit includes a certain sensor unit disposed internally of the stationary section, wherein the determining includes determining that a wet cycle has occurred if an amplitude of an output of the certain sensor unit exceeds a threshold, and wherein the determining includes determining that a dry cycle has occurred if an output of the certain sensor remains essentially flat line with a clamping state of the mold passing between a first declamped state, a clamped state, a second declamped state.

D9. The system of D1, wherein the one or more sensor unit includes a certain sensor unit disposed at an ejector assembly of the moveable section, and wherein the determining includes determining that a wet cycle has occurred when an amplitude of an output of the certain sensor unit exceeds a first threshold, wherein the determining further includes determining that a dry cycle has occurred if an amplitude of an output of the certain sensor unit exceeds a second threshold while remaining lower than a first threshold, the first threshold being higher than the second threshold.

D10. The system of D1, wherein the determining includes determining that a maintenance servicing has become due for the one or more component of the mold based on a count of the one or more component of the mold, and wherein the one or more processing circuit is operative to output an indicator indicating that a maintenance servicing has become due for the one or more component.

E1. A system for use in performance of injection molding operations, the system comprising:
  an injection molding assembly comprising an injection molding machine and a mold, the mold having a stationary section and a moveable section;
  a sensor unit assembly having one or more sensor unit disposed at the injection molding assembly mold;
  wherein the system is operative for examining an output of the one or more sensor unit for determining a measurement of use of one or more component of the mold;
  wherein the system is operative so that responsively to a first result of the examining the system activates a first process of the injection molding assembly;
  wherein the system is further operative so that responsively to a second result of the examining the system activates a second process of the injection molding assembly.

E2. The system of E1, wherein the measurement of use is a cycle count.

E3. The system of E1, wherein the first and second process are processes performed by the injection molding machine during a cycle of the injection molding assembly.

E4. The system of E1, wherein the first process and second process are processes performed by the injection molding machine.

E5. The system of E1, wherein the first process and second process are processes performed by the mold.

E6. The system of E1, wherein the examining includes examining an output of a sensor unit disposed internally of the stationary section for determining whether has been a flow of fluid through the stationary section.

E7. The system of E1, wherein the examining includes examining an output of a sensor unit disposed at the moveable section of the mold.

E8. The system of E1, wherein the examining includes examining an output of a sensor unit disposed at an ejector assembly for determining whether there has been an ejector of a finished mold part.

E9. The system of E1, wherein the examining includes examining an output of a first sensor unit and a second sensor unit.

E10. The system of E1, wherein the examining includes examining an output of a first sensor unit and a second sensor unit, the first sensor unit being disposed at a base portion of a mold section, the second sensor unit being disposed at a modular insert portion of a mold section.

E11. The system of E1, wherein the examining includes examining an output of a first sensor unit and a second sensor unit, the first sensor unit being disposed at the stationary section, the second sensor unit being disposed at the moveable section.

E12. The system of E1, wherein the examining includes examining an output of a first sensor unit and a second sensor unit, the first sensor unit being disposed internally of a mold section, the second sensor unit being disposed at an external surface of a mold section.

F1. An injection molding assembly mold, the injection molding assembly mold comprising:
  a stationary section and a moveable section wherein the stationary section and the moveable section are operative to move relative to one another between clamping states comprising a clamped state and declamped state;
  wherein one or more of the stationary section and the moveable section includes a replaceable modular insert portion that is replaceably received on a base portion of the one or more of the stationary section and the moveable section including the replaceable modular insert portion;
  a sensor unit disposed at the replaceable modular insert portion, the sensor unit outputting a signal indicating a clamping state of the injection molding assembly mold.

F2. The injection molding assembly of F1, wherein the replaceable modular insert portion includes a feature selected from the group consisting of a valve, a cavity, a core, and a thread split.

G1. A system comprising:
- a injection molding assembly mold having a stationary section and moveable section, the stationary section having one or more nozzle, the mold further having a sensor unit array, the sensor unit array comprising one or more sensor unit disposed at one or more of the stationary section and the moveable section of the injection molding assembly mold;
- one or more processing circuit operative for examining an output of the one or more sensor unit and further being operative for, based on the examining, determining an amount of an invoice for presentment to a customer for use of the injection molding assembly mold.

G2. The system of G1, wherein the determining includes discriminating between wet cycles and dry cycles.

G3. The system of G1, wherein the sensor unit array includes a sensor unit disposed internally of the stationary mold section for determining whether there is a flow of fluid through the stationary section, and wherein the examining includes examining an output of the sensor unit disposed internally of the stationary section.

G4. The system of G1, wherein the sensor unit array includes a sensor unit disposed at an ejector assembly of the moveable section for sensing whether a finished part has been ejected from the mold, and wherein the examining includes examining an output of the sensor unit disposed at the ejector assembly.

G5. The system of G1, wherein the sensor unit array includes a first sensor unit and a second sensor unit, and wherein the examining includes examining an output of the first sensing unit and the second sensing unit.

G6. The system of G1, wherein the sensor unit array includes a first sensor unit and a second sensor unit, and wherein the examining includes examining an output of the first sensing unit and the second sensing unit, the first sensing unit being disposed at the stationary section, the second sensing unit being disposed at the moveable section.

G7. The system of G1, wherein the sensor unit array includes a first sensor unit and a second sensor unit, and wherein the examining includes examining an output of the first sensing unit and the second sensing unit, the first sensing unit being disposed internally of the stationary section, the second sensing unit being disposed at an ejector assembly of the moveable section.

H1. A computer program product for use in invoicing of a customer that uses an injection molding assembly mold, the computer program product comprising:
- a computer readable storage medium readable by one or more processor that stores instructions for execution by the one or more processor which when executed cause the one or more processor to perform an examining of an output of one or more sensor unit, the one or more sensor unit being disposed at one or more of a stationary section and a moveable section of the mold, and, responsively to the output of one or more sensor unit determine an amount of an invoice for presentment to a customer for use of the injection molding assembly mold.

H2. The computer program product of H1, wherein the examining includes examining an output of the sensor unit disposed internally of the stationary section.

H3. The computer program product of H1, wherein the examining includes examining an output of the sensor unit disposed at the ejector assembly.

H4. The computer program product of H1, wherein the examining included examining an output of the first sensing unit and the second sensing unit.

H5. The computer program product of H1, wherein the examining includes examining an output of the first sensing unit and the second sensing unit, the first sensing unit being disposed at the stationary section, the second sensing unit being disposed at the moveable section.

H6. The computer program product of H1, wherein the examining includes examining an output of the first sensing unit and the second sensing unit, the first sensing unit being disposed internally of the station section, the second sensing unit being disposed at an ejector assembly of the moveable section.

I1. A computer program product for use in performance of injecting molding operations, the computer program product comprising;
- a computer readable storage medium readable by one or more processor and storing instructions for execution by the one or more processor which when executed cause the one or more processor to perform an examining of an output of one or more sensor unit being disposed at one or more of a stationary section and a moveable section of an injecting on molding assembly molding and responsively to the output of one or more sensor unit determine a wet cycle count of one or more component of the mold and further responsively to the output of the one or more sensor unit determine a dry cycle count of the one or more component of the mold.

I2. The computer program product of I1, wherein the examining includes examining an output of the sensor unit disposed internally of the stationary section.

I3. The computer program product of I1, wherein the examining includes examining an output of the sensor unit disposed at the ejector assembly.

I4. The computer program product of I1, wherein the examining included examining an output of the first sensing unit and the second sensing unit.

I5. The computer program product of I1, wherein the examining includes examining an output of the first sensing unit and the second sensing unit, the first sensing unit being disposed at the stationary section, the second sensing unit being disposed at the moveable section.

I6. The computer program product of I1, wherein the examining includes examining an output of the first sensing unit and the second sensing unit, the first sensing unit being disposed internally of the station section, the second sensing unit being disposed at an ejector assembly of the moveable section.

J1. A system comprising:
- an injection molding assembly mold having a stationary section and moveable section, the stationary section having a channel assembly and one or more nozzle, the mold further having a sensor unit array, the sensor unit array comprising one or more sensor unit disposed at the injection molding assembly mold, the one or more sensor unit including one or more sensor unit provided by a strain gauge having an associated backing, the strain gauge having an associated backing disposed at a surface of a structural member of the injection molding assembly mold so that the strain gauge generates a signal responsively to a deformation of the structural member;
- one or more processing circuit that utilizes an output of the strain gauge for determining a cycle count of one or more component of the mold.

J2. The system of J1, wherein the strain gauge is disposed at an external surface of the mold.

J3. The system of J1, wherein the strain gauge is disposed along or around an external surface of a nozzle.

J4. The system of J1, wherein the strain gauge is disposed along or around an external surface of a channel.

J5. The system of J1, wherein the strain gauge is disposed along or around an external surface of an inlet.

J6. The system of J1, wherein the one or more component includes a component having a structural member comprising an area of standard thickness and an area of reduced thickness, and wherein the strain gauge is disposed at the area of reduced thickness.

J7. The system of J1, wherein the one or more component includes a component having a structural member comprising a cylindrical structural member adapted to include a flat, the strain gauge being disposed at the flat.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or more than the mentioned certain number of elements. Also, while a number of particular embodiments have been described, it will be understood that features and aspects that have been described with reference to each particular embodiment can be used with each remaining particularly described embodiment.

The invention claimed is:

1. A system comprising:
an injection molding assembly mold having a stationary section and a moveable section, the stationary section having a channel assembly and one or more nozzle, the mold further having a sensor unit array,
wherein the sensor unit array includes one or more sensor unit disposed at the moveable section of the mold for sensing whether a molded part has been ejected from the mold; and
one or more processing circuit operative for utilizing an output of the one or more sensor unit, the utilizing comprising determining a cycle count of one or more component of the mold, wherein the one or more sensor unit disposed at the moveable section of the mold for sensing whether a molded part has been ejected from the mold includes a force sensor unit disposed at an ejector assembly, the force sensor unit outputting an amplitude varying signal that outputs a signal of relatively higher peak amplitude when the ejector assembly is actuated with a part held within the moveable section, and outputs a signal of relatively lower peak amplitude when the ejector assembly is actuated with a part not held within the movable section.

2. The system of claim 1, wherein the one or more sensor unit disposed at the moveable section of the mold includes one or more contact switches disposed to sense whether there has been a clamping of the moveable section to the stationary section.

3. The system of claim 1, wherein the sensor unit array further includes one or more sensor unit disposed at the stationary section of the mold, wherein the processing circuit utilizes an output of the one or more sensor unit disposed at the stationary section for determining a cycle count of one or more components of the mold.

4. The system of claim 1, wherein the one or more processing circuit records a cycle count for the moveable section of the mold and separately records a cycle count for the stationary section of the mold, the system being operative to display the cycle count for the moveable section, the system being operative to display the cycle count for the stationary section.

5. A system comprising:
an injection molding assembly mold having a stationary section and a moveable section, the stationary section having a channel assembly and one or more nozzle, the mold further having a sensor unit array, the sensor unit array comprising one or more sensor unit disposed at one or more of the stationary section and the moveable section of the injection molding assembly mold; and
one or more processing circuit that utilizes an output of the one or more sensor unit for determining a cycle count for one or more component of the mold, wherein the one or more processing circuit is operative to discriminate between a wet cycle and a dry cycle of the one or more component of the mold utilizing the output of the one or more sensor unit, wherein the one or more sensor unit includes a certain sensor unit disposed at an ejector assembly of the moveable section, and wherein the determining includes determining that a wet cycle has occurred if an amplitude of an output of the certain sensor unit exceeds a first threshold, wherein the determining further includes determining that a dry cycle has occurred if an amplitude of an output of the certain sensor unit exceeds a second threshold while remaining lower than a first threshold, the first threshold being higher than the second threshold.

6. The system of claim 5, wherein the system is operative to output an indicator indicative of a result of the determining.

7. The system of claim 5, wherein the system is operative to output a result of the determining to a process control interface.

8. The system of claim 5, wherein the determining includes determining a wet cycle count and a dry cycle count for the stationary section.

9. The system of claim 5, wherein the determining includes determining a wet cycle count and a dry cycle count for the moveable section.

10. The system of claim 5, wherein the sensor unit array includes a first sensor unit disposed at a first mold component provided by a base portion of a mold section and wherein the sensor unit array further includes a second sensor unit disposed at a second mold component provided by a modular portion of the mold section, wherein the determining includes utilizing an output of the first sensor unit for determining a cycle count of the first mold component and utilizing an output of the second sensor unit for determining a cycle count of the second mold component.

11. The system of claim 5, wherein the sensor unit array includes a first sensor unit disposed at the stationary section and wherein the sensor unit array further includes a second sensor unit disposed at the moveable section, wherein the determining includes utilizing an output of the first sensor unit for determining a cycle count of the stationary section and utilizing an output of the second sensor unit for determining a cycle count of the moveable section.

12. The system of claim 5, wherein the one or more sensor unit includes a certain sensor unit disposed internally of the stationary section, wherein the determining includes determining that a wet cycle has occurred if an amplitude of an output of the certain sensor unit exceeds a threshold, and wherein the determining includes determining that a dry cycle has occurred if an output of the certain sensor remains essentially flat line with a clamping state of the mold passing between a first declamped state, a clamped state, a second declamped state.

13. The system of claim 5, wherein the determining includes determining that a maintenance servicing has become due for the one or more component of the mold based on a count of the one or more component of the mold, and wherein the one or more processing circuit is operative to output an indicator indicating that a maintenance servicing has become due for the one or more component.

* * * * *